(12) United States Patent
Chin et al.

(10) Patent No.: US 11,722,524 B2
(45) Date of Patent: Aug. 8, 2023

(54) DYNAMIC EVENT SECURITIZATION AND NEURAL NETWORK ANALYSIS SYSTEM

(71) Applicant: Bank of America Corporation, Charlotte, NC (US)

(72) Inventors: Chie Khiong Chin, Singapore (SG); Ayush Anand, Singapore (SG); Harish Tammaji Kulkarni, Singapore (SG); Simon Peter Lawrie, Singapore (SG); Nhat Minh Nguyen, Singapore (SG)

(73) Assignee: Bank of America Corporation, Charlotte, NC (US)

( * ) Notice: Subject to any disclaimer, the term of this patent is extended or adjusted under 35 U.S.C. 154(b) by 273 days.

(21) Appl. No.: 17/224,612

(22) Filed: Apr. 7, 2021

(65) Prior Publication Data

US 2022/0329631 A1    Oct. 13, 2022

Related U.S. Application Data

(63) Continuation of application No. 16/258,418, filed on Jan. 25, 2019, now Pat. No. 10,893,024, which is a (Continued)

(51) Int. Cl.
*H04L 9/40* (2022.01)
*G06N 3/04* (2023.01)
*G06F 9/451* (2018.01)

(52) U.S. Cl.
CPC .............. *H04L 63/20* (2013.01); *G06F 9/451* (2018.02); *G06N 3/04* (2013.01)

(58) Field of Classification Search
CPC ............ H04L 63/20; G06F 9/451; G06N 3/04
(Continued)

(56) References Cited

U.S. PATENT DOCUMENTS 8,578,486 B2    11/2013    Lifliand et al.
8,924,743 B2    12/2014    Conte et al.
(Continued)

OTHER PUBLICATIONS

Dean et al. 2016 IEEE International Joint Conference on Neural Networks (IJCNN), "An Application Development Platform for Neuromorphic Computing", pp. 1347-1354 (Year: 2016).*

(Continued)

*Primary Examiner* — Khalil Naghdali
(74) *Attorney, Agent, or Firm* — Banner & Witcoff, Ltd.

(57) ABSTRACT

Aspects of the disclosure relate to a dynamic event securitization and neural network analysis system. A dynamic event inspection and securitization computing platform comprising at least one processor, a communication interface, and memory storing computer-readable instructions may securitize event data prior to authorizing execution of the event. A neural network event analysis computing platform comprising at least one processor, a communication interface, and memory storing computer-readable instructions may utilize a plurality of event analysis modules, a neural network, and a decision engine to analyze the risk level values of data sharing events. The dynamic event inspection and securitization computing platform may interface with the neural network event analysis computing platform by generating data securitization flags that may be utilized by the neural network event analysis computing platform to modify event analysis results generated by the event analysis modules.

20 Claims, 18 Drawing Sheets

Related U.S. Application Data continuation of application No. 15/798,052, filed on Oct. 30, 2017, now Pat. No. 10,193,866, which is a continuation of application No. 14/109,535, filed on Dec. 17, 2013, now Pat. No. 9,807,057.

(58) Field of Classification Search
USPC .......................................................... 726/25
See application file for complete search history.

(56) References Cited

U.S. PATENT DOCUMENTS

| | | |
|---|---|---|
| 8,959,329 B2 | 2/2015 | Altman |
| 9,917,856 B2 | 3/2018 | Ahn et al. |
| 10,341,311 B2 | 7/2019 | Smith et al. |
| 10,397,274 B2 | 8/2019 | Manasse et al. |
| 2018/0316674 A1 | 11/2018 | Shaked |
| 2019/0311136 A1 | 10/2019 | Pai et al. |
| 2021/0406673 A1* | 12/2021 | Pardeshi ............. G06F 3/04815 |

OTHER PUBLICATIONS

Guan et al., 2020 IEEE, "Security Analysis of Power System User Behavior in Big Data Based on Comparative of Neural Network Methods", pp. 46-51 (Year: 2020).*

* cited by examiner

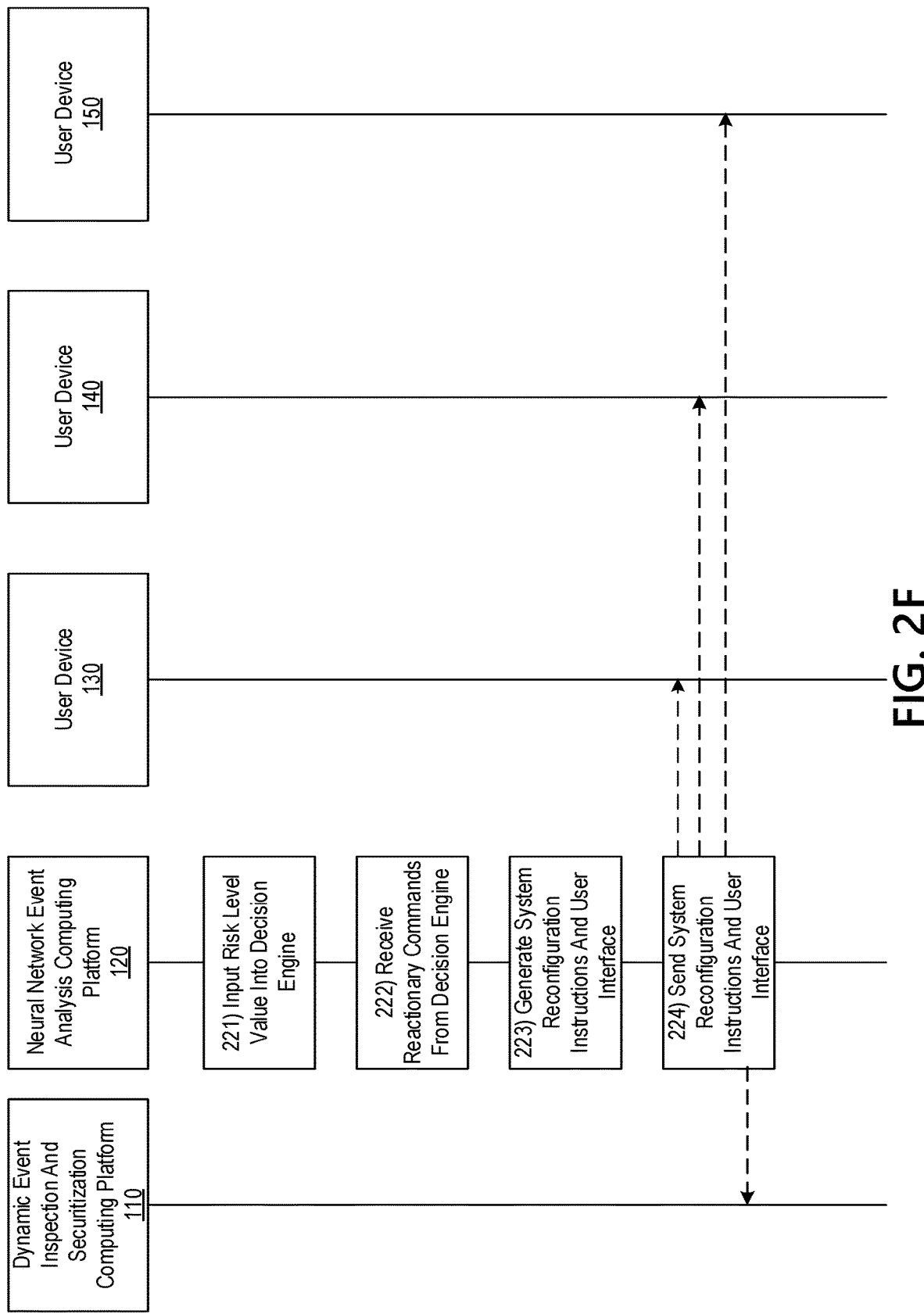

Securitized File Sharing Interface — 300, 310

Please Select Files for Upload

File 1
File 2
•
•
•
File N

320

Please Enter Password For Each File

File 1
File 2
•
•
•
File N

330

Please Enter Additional Data

Destination

DYNAMIC EVENT SECURITIZATION AND NEURAL NETWORK ANALYSIS SYSTEM

BACKGROUND

Aspects of the disclosure relate to a dynamic event securitization and neural analysis system. In particular, one or more aspects of the disclosure relate to the securitization of data prior to authorizing execution of an event, such as a data transfer event, and utilizing a neural network model to analyze the risk level value of the event.

In some cases, enterprise organizations may comprise hundreds of thousands of employees that regularly and repeatedly share enterprise data. The data may be shared with computer systems that are internal to the enterprise organization and/or external to the enterprise organization. This leads to a dangerously high risk that confidential and sensitive enterprise data may be shared with unauthorized remote computer systems. Current data loss protection software is heavily focused on the content of data that is shared by employees of enterprise organizations. This detrimentally ignores other factors that may be critically indicative of an unauthorized data leak, such as the intent of enterprise organization employees. Moreover, current data loss protection software lacks the technical capability that would be required to examine factors beyond just the data content and the scalability that would be required to examine additional factors for hundreds of thousands of employees.

SUMMARY

Aspects of the disclosure provide effective, efficient, scalable, and convenient technical solutions that address and overcome the technical problems associated with conventional data loss protection systems. In accordance with one or more embodiments of the disclosure, a computing platform comprising at least one processor, a communication interface, and memory storing computer-readable instructions may receive, from a user device, a first event. The computing platform may generate, based on the first event, a securitized file-sharing user interface configured to receive one or more files for secure sharing to a remote computing device located outside of an enterprise network. The computing platform may send, to the user device, the securitized file-sharing user interface, wherein sending the securitized file-sharing user interface to the user device causes the user device to display the securitized file-sharing user interface. The computing platform may receive, from the user device, via the securitized file-sharing user interface, one or more user files and security data associated with the one or more user files. The computing platform may inspect each of the one or more user files. The computing platform may securitize each of the one or more user files to generate one or more securitized user files. The computing platform may send, to the user device, the one or more securitized user files. The computing platform may generate, based on a result of inspecting each of the one or more user files, one or more data securitization flags, wherein the one or more data securitization flags are configured to cause a computing platform to modify event analysis results. The computing platform may send, to the computing platform, the one or more data securitization flags and first event data associated with the first event. The computing platform may receive, from the computing platform, one or more system reconfiguration instructions. The computing platform may update one or more security settings of the dynamic event securitization computing platform based on the system reconfiguration instructions.

In one or more instances, securitizing each of the one or more user files may comprise encrypting each of the one or more user files.

In some instances, the computing platform may dynamically determine an encryption algorithm to be used to encrypt the one or more user files based on a content of the one or more user files.

In one or more instances, a first data securitization flag of the one or more data securitization flags may be associated with a first event analysis module of the computing platform. In one or more instances, the first event analysis module may be an obfuscation analysis module configured to detect encrypted files.

In one or more instances, the security data comprises one or more passwords for the one or more user files. The computing platform may analyze the one or more passwords to determine whether the one or more passwords conform to password security requirements.

In some instances, the computing platform may receive, from the computing platform, a user interface associated with the first event. The computing platform may display the user interface.

In accordance with one or more additional or alternative embodiments, a computing platform comprising at least one processor, a communication interface, and memory storing computer-readable instructions may receive, from a first computing platform, first test configuration data for a first test. The computing platform may receive, from a user device, a first event data associated with a first event. The computing platform may input, into a plurality of event analysis modules, the first event data. The computing platform may receive, from the plurality of event analysis modules and based on the first event data, analysis results. The computing platform may input the analysis results received from the plurality of event analysis modules into a neural network model, wherein inputting the analysis results into the neural network model causes the neural network model to output a risk level value associated with the first event. The computing platform may input data associated with the risk level value into a decision engine, wherein inputting the data associated with the risk level value into the decision engine causes the decision engine to output one or more reactionary commands based on the risk level value. The computing platform may generate one or more system reconfiguration instructions associated with the one or more reactionary commands. The computing platform may send, to the user device, the one or more system reconfiguration instructions associated with the one or more reactionary commands, wherein sending the one or more system reconfiguration instructions associated with the one or more reactionary commands to the user device causes the user device to modify one or more security settings of the user device based on the one or more system reconfiguration instructions associated with the one or more reactionary commands.

The computing platform may update the neural network model based on a result of the analyzing the first event and based on the risk level value, wherein updating the neural network model comprises updating a first node, of the neural network model, that is associated with a first event analysis module of the plurality of event analysis modules.

In one or more instances, the first event analysis module may be an obfuscation analysis module configured to detect, within the first event data associated with the first event, one or more of encrypted files, multi-level file embedding, or files embedded within an object.

In one or more instances, the first event analysis module may be a user activity analysis module configured to analyze historical data of a user associated with the first event.

In one or more instances, the first event analysis module may be a target domain analysis module configured to analyze a target domain associated with the first event.

In one or more instances, the first event analysis module may be a target domain analysis module configured to analyze a plurality of factors of a target domain associated with the first event.

In one or more instances, the first event analysis module may be a user access analysis module configured to analyze access rights of a user associated with the first event.

The computing platform may generate a user interface associated with the first event and the reactionary commands. The computing platform may send, to the user device, the user interface, wherein sending the user interface to the user device causes the user device to display the user interface.

In one or more instances, the analysis results may comprise one or more weighted risk scores.

In one or more instances, the decision engine may comprise a risk level matrix that maps different combinations of weighted risk scores to different reactionary commands.

In accordance with one or more additional or alternative embodiments, a dynamic event securitization computing platform comprising at least one processor, a communication interface, and memory storing computer-readable instructions may receive, from a user device, a first event. The dynamic event securitization may generate, based on the first event, a securitized file-sharing user interface configured to receive one or more files for secure sharing to a remote computing device located outside of an enterprise network. The dynamic event securitization may send, to the user device, the securitized file-sharing user interface. The dynamic event securitization may receive, from the user device, one or more data files. The dynamic event securitization may generate, based on a result of inspecting each of the one or more data files, a data securitization flag, wherein the data securitization flag is configured to cause a neural network analysis computing platform to modify event analysis results. The dynamic event securitization may send, to a neural network analysis computing platform, the data securitization flag and data associated with the first event.

In accordance with one or more embodiments of the disclosure, a neural network analysis computing platform comprising at least one processor, a communication interface, and memory storing computer-readable instructions may receive, from the dynamic event securitization computing platform, the data securitization flag and the data associated with the first event. The neural network analysis computing platform may analyze, using a plurality of event analysis modules, the data associated with the first event to generate analysis results. The neural network analysis computing platform may modify, based on the data securitization flag, the analysis results to generate modified analysis results. The neural network analysis computing platform may input the modified analysis results into a neural network model. The neural network analysis computing platform may receive, from the neural network model, a risk level value associated with the first event. The neural network analysis computing platform may input data associated with the risk level value into a decision engine, wherein inputting the data associated with the risk level value into the decision engine causes the decision engine to output one or more reactionary commands based on the risk level value. The neural network analysis computing platform may generate system reconfiguration instructions associated with the one or more reactionary commands.

In one or more instances, sending the securitized file-sharing user interface to the user device may cause the user device to display the securitized file-sharing user interface.

The neural network analysis computing platform may send, to the dynamic event securitization computing platform, the system reconfiguration instructions, wherein the sending the system reconfiguration instructions to the dynamic event securitization computing platform causes the dynamic event securitization computing platform to modify one or more security settings of the dynamic event securitization computing platform based on the system reconfiguration instructions.

In one or more instances, the data securitization flag may be associated with a first event analysis module of the plurality of event analysis modules. In one or more instances, modifying the analysis results may comprise modifying a first weighted risk score output by the first event analysis module The neural network analysis computing platform may send, to the dynamic event securitization computing platform, the system reconfiguration instructions, wherein the sending the system reconfiguration instructions to the dynamic event securitization computing platform causes the dynamic event securitization computing platform to modify one or more security settings of the dynamic event securitization computing platform based on the system reconfiguration instructions.

In one or more instances, a first event analysis module of the plurality of event analysis modules may be an obfuscation analysis module configured to detect, within the data associated with the first event, one or more of encrypted files, multi-level file embedding, or files embedded within an object.

In one or more instances, a first event analysis module of the plurality of event analysis modules may be a user activity analysis module configured to analyze historical data of a user associated with the first event.

In one or more instances, a first event analysis module of the plurality of event analysis modules may be a target domain analysis module configured to analyze a target domain associated with the first event.

In one or more instances, a first event analysis module of the plurality of event analysis modules may be a user access analysis module configured to analyze access rights of a user associated with the first event.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2J depict an illustrative event sequence for implementing a dynamic event securitization and neural network analysis system in accordance with one or more example embodiments;

FIGS. 3A-3B depict illustrative graphical user interfaces that implement a dynamic event securitization and neural network analysis system with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to a dynamic event securitization and neural network analysis system. To improve the accuracy and technical capabilities of current data loss protection software, an enterprise may implement a dynamic event securitization and neural network analysis system that comprises the technical capabilities to examine a multitude of factors that go beyond only the data content itself.

In such a dynamic event securitization and neural network analysis system, a dynamic event inspection and securitization computing platform may securitize event data prior to authorizing execution of the event, such as a data transfer event. Further in such a dynamic event securitization and neural network analysis system, a neural network event analysis computing platform may utilize a plurality of event analysis modules, a neural network, and a decision engine to analyze the risk level values of data sharing events. The dynamic event inspection and securitization computing platform of the dynamic event securitization and neural network analysis system may interface with the neural network event analysis computing platform of the dynamic event securitization and neural network analysis system. Specifically, the dynamic event inspection and securitization computing platform may generate and send data securitization flags to the neural network event analysis computing platform. The neural network event analysis computing platform may then utilize those data securitization flags to modify event analysis results generated by the event analysis modules of the neural network event analysis computing platform.

Figure 1A:
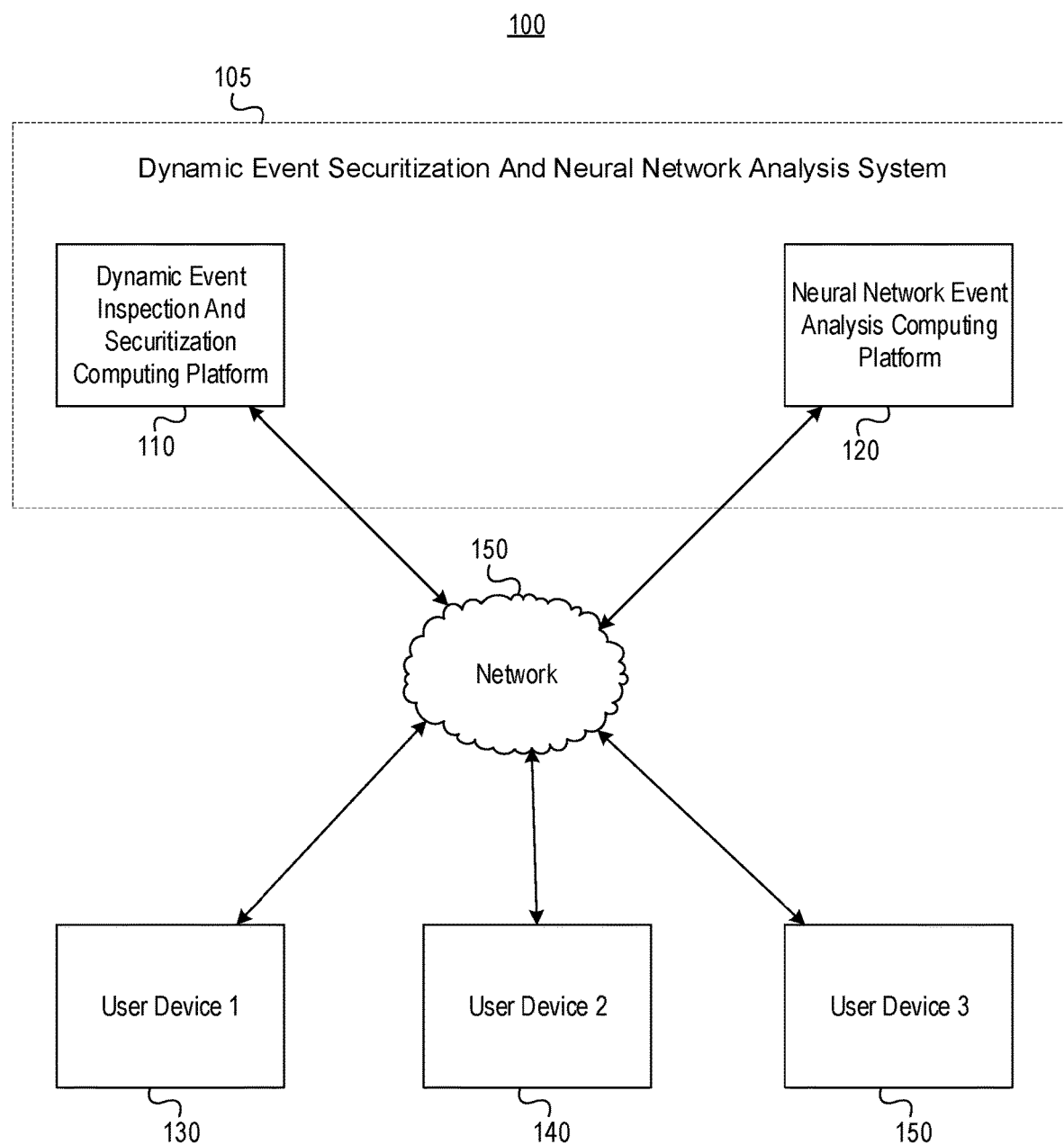
FIG. 1A depicts an illustrative computing environment for implementing a dynamic event securitization and neural network analysis system in accordance with one or more example embodiments.

FIG. 1A depicts an illustrative computing environment that implements a dynamic event securitization and neural network analysis system with one or more example embodiments. Referring to FIG. 1A, computing environment 100 may include one or more computer systems. For example, computing environment 100 may include dynamic event securitization and neural network analysis system 105 that includes dynamic event inspection and securitization computing platform 110 and neural network event analysis computing platform 120. Computing environment 100 may additionally include user device 130, user device 140, and/or user device 150. Although dynamic event securitization and neural network analysis system 105 is depicted as being implemented on two computer systems (dynamic event inspection and securitization computing platform 110 and neural network event analysis computing platform 120), dynamic event securitization and neural network analysis system 105 may, in some instances, be implemented using one computer system (that is, one computer system that implements the below-described functionality of both dynamic event inspection and securitization computing platform 110 and neural network event analysis computing platform 120), or alternatively, using more than two computer systems (that is, three or more computer systems that collectively implement the below-described functionality of dynamic event inspection and securitization computing platform 110 and neural network event analysis computing platform 120).

As described further below, dynamic event inspection and securitization computing platform 110 may be a computer system that includes one or more computing devices (e.g., servers, server blades, or the like) and/or other computer components (e.g., processors, memories, communication interfaces) that may be used to inspect and secure one or more events prior to authorizing the execution of those events. In some instances, dynamic event inspection and securitization computing platform 110 may be controlled or otherwise maintained by an enterprise organization such as a financial institution.

Similarly, neural network event analysis computing platform 120 may be a computer system that includes one or more computing devices (e.g., servers, server blades, or the like) and/or other computer components (e.g., processors, memories, communication interfaces) that may be used to analyze one or more events using a neural network model and a decision engine. In some instances, neural network event analysis computing platform 120 may be controlled or otherwise maintained by an enterprise organization such as a financial institution.

User device 130 may be a computer system that includes one or more computing devices (e.g., servers, server blades, laptop computers, desktop computers, mobile devices, tablets, smartphones, credit card readers, or the like) and/or other computer components (e.g., processors, memories, communication interfaces) that may be used to perform enterprise operations and/or event processing. In one or more instances, user device 130 may be configured to communicate with dynamic event securitization and neural network analysis system 105 (via dynamic event inspection and securitization computing platform 110 and neural network event analysis computing platform 120) for event authorization and/or event analysis. User device 140 and user device 150 may be user devices similar to user device 130.

Computing environment 100 also may include one or more networks, which may interconnect dynamic event securitization and neural network analysis system 105 (e.g., dynamic event inspection and securitization computing platform 110 and neural network event analysis computing platform 120), user device 130, user device 140, and/or user device 150. For example, computing environment 100 may include a network 160 (which may interconnect, e.g., dynamic event securitization and neural network analysis system 105 (e.g., dynamic event inspection and securitization computing platform 110 and neural network event analysis computing platform 120), user device 130, user device 140, and/or user device 150).

In one or more arrangements, dynamic event securitization and neural network analysis system 105 (e.g., dynamic event inspection and securitization computing platform 110 and neural network event analysis computing platform 120), user device 130, user device 140, and/or user device 150, may be any type of computing device capable of sending and/or receiving requests and processing the requests accordingly. For example, dynamic event securitization and neural network analysis system 105 (e.g., dynamic event inspection and securitization computing platform 110 and neural network event analysis computing platform 120), user device 130, user device 140, user device 150, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of dynamic event securitization and neural network analysis system 105 (e.g., dynamic event inspection and securitization computing platform 110 and neural network event analysis computing platform 120), user device 130, user device 140, and/or user device 150, may, in some instances, be special-purpose computing devices configured to perform specific functions.

Figure 1B:
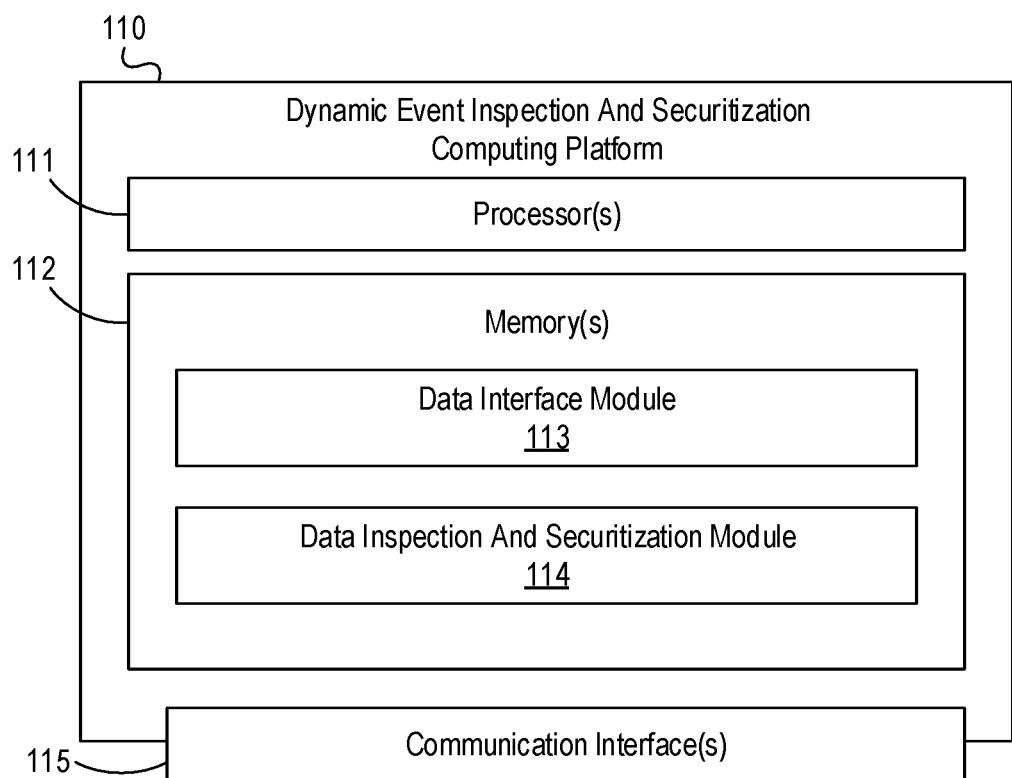
FIG. 1B depicts additional elements of an illustrative computing environment for implementing a dynamic event inspection and securitization computing platform in accordance with one or more example embodiments.

Referring to FIG. 1B, dynamic event inspection and securitization computing platform 110 may include one or more processors 111, memory 112, and communication interface 115. A data bus may interconnect processor 111, memory 112, and communication interface 115. Communication interface 115 may be a network interface configured to support communication between dynamic event inspection and securitization computing platform 110 and one or more networks (e.g., network 160, or the like). Memory 112 may include one or more program modules having instructions that when executed by processor 111 cause dynamic event inspection and securitization computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of dynamic event inspection and securitization computing platform 110 and/or by different computing devices that may form and/or otherwise make up dynamic event inspection and securitization computing platform 110. For example, memory 112 may have, host, store, and/or include data interface module 113 and/or data inspection and securitization module 114.

Data interface module 113 may have instructions that direct and/or cause dynamic event inspection and securitization computing platform 110 to receive input data from any of the computer systems shown in FIG. 1A (i.e., neural network event analysis computing platform 120, user device 130, user device 140, and/or user device 150) and/or to send output data to any of the computer systems shown in FIG. 1A (i.e., neural network event analysis computing platform 120, user device 130, user device 140, and/or user device 150). Data inspection and securitization module 114 may have instructions that direct and/or cause dynamic event inspection and securitization computing platform 110 to inspect and/or securitize one or more events prior to authorizing execution of those events.

Figure 1C:
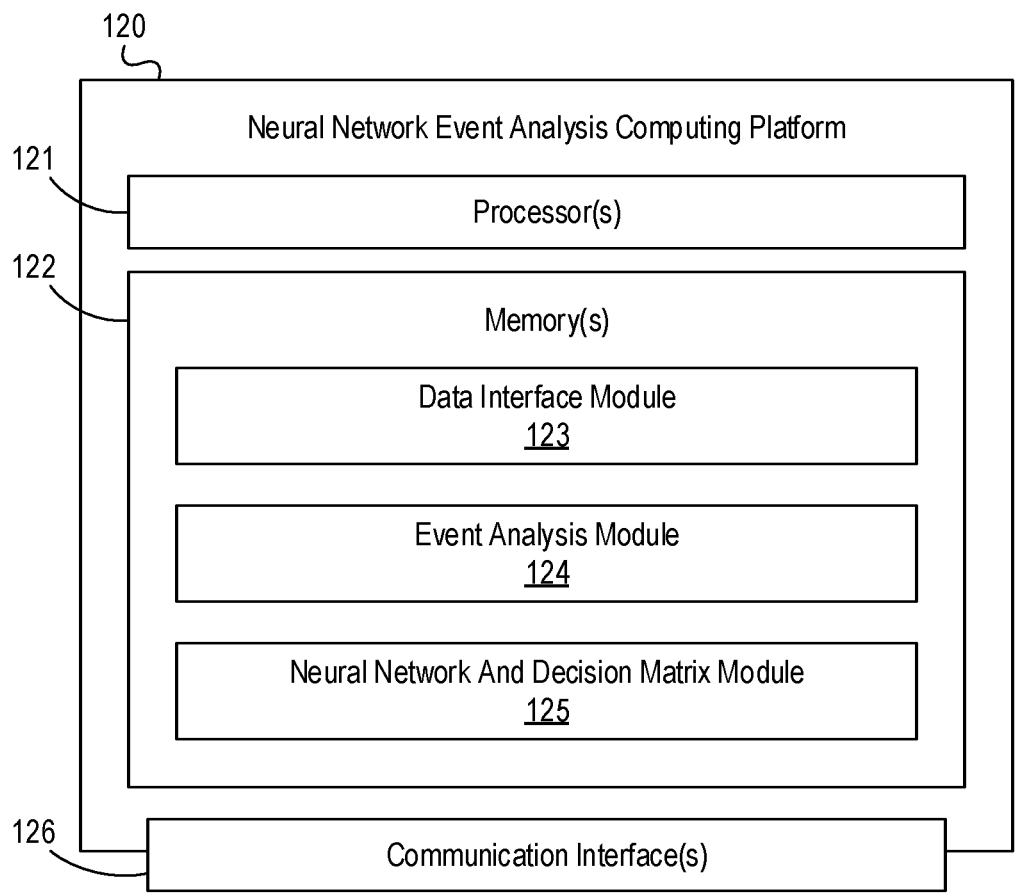
FIG. 1C depicts additional elements of an illustrative computing environment for implementing a neural network event analysis computing platform in accordance with one or more example embodiments.

Referring to FIG. 1C, neural network event analysis computing platform 120 may include one or more processors 121, memory 122, and communication interface 126. A data bus may interconnect processor 121, memory 122, and communication interface 126. Communication interface 126 may be a network interface configured to support communication between neural network event analysis computing platform 120 and one or more networks (e.g., network 160, or the like). Memory 122 may include one or more program modules having instructions that when executed by processor 121 cause neural network event analysis computing platform 120 to perform one or more functions described herein and/or one or more databases that may store and/or otherwise maintain information which may be used by such program modules and/or processor 121. In some instances, the one or more program modules and/or databases may be stored by and/or maintained in different memory units of neural network event analysis computing platform 120 and/or by different computing devices that may form and/or otherwise make up neural network event analysis computing platform 120. For example, memory 122 may have, host, store, and/or include data interface module 123, event analysis module 124, and neural network and decision matrix module 125.

Data interface module 123 may have instructions that direct and/or cause neural network event analysis computing platform 120 to receive input data from any of the computer systems shown in FIG. 1A (i.e., dynamic event inspection and securitization computing platform 110, user device 130, user device 140, and/or user device 150) and/or to send output data to any of the computer systems shown in FIG. 1A (i.e., dynamic event inspection and securitization computing platform 110, user device 130, user device 140, and/or user device 150). Event analysis module 124 may have instructions that direct and/or cause neural network event analysis computing platform 120 to analyze one or more events using one or more event analysis modules. Neural network and decision matrix module 125 may have instructions that direct and/or cause neural network event analysis computing platform 120 to execute a neural network model and/or a decision engine to further analyze the one or more events.

Figure 2A:
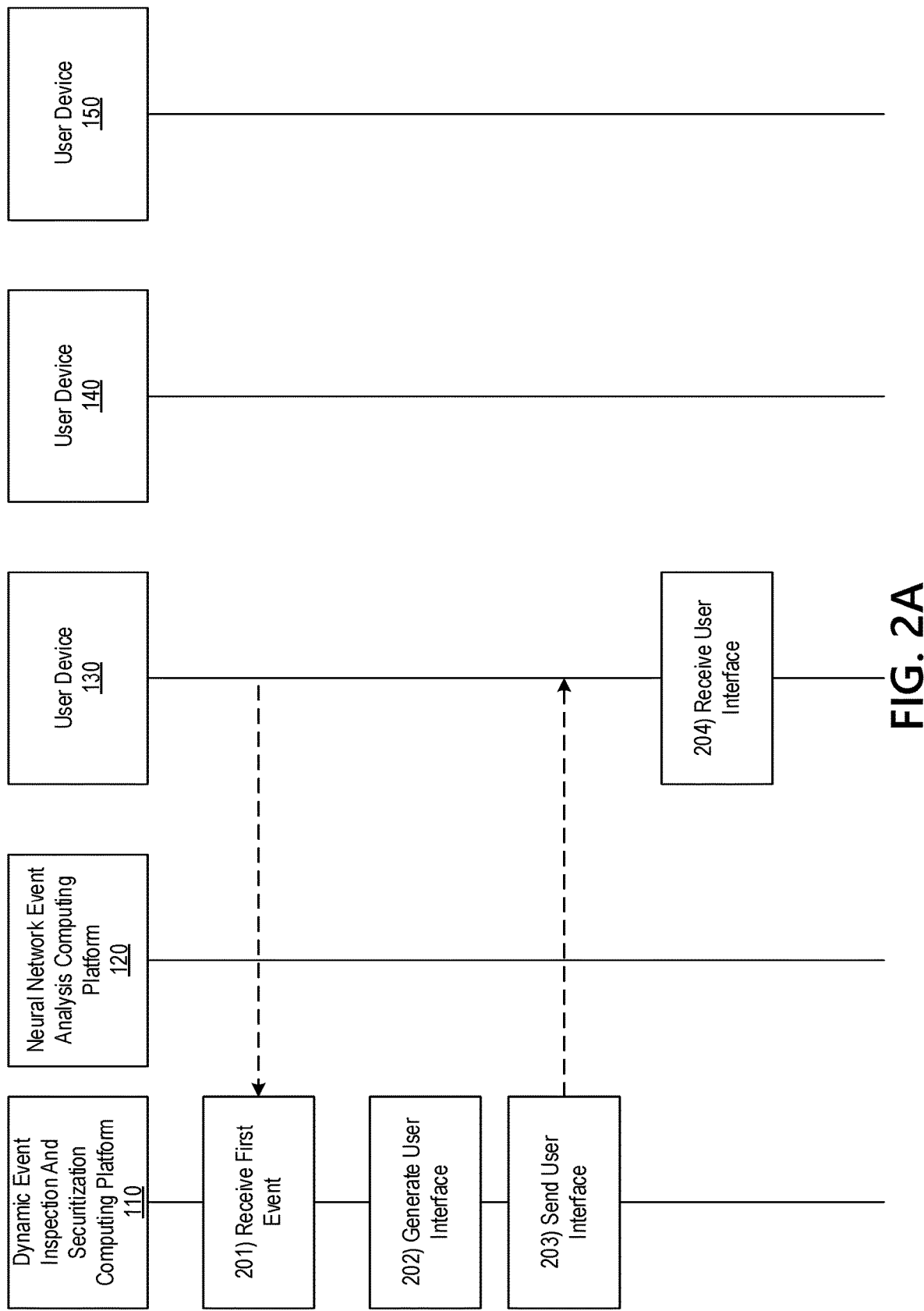

FIGS. 2A-2J depict an illustrative event sequence for implementing dynamic event securitization and neural network analysis system 105 in accordance with one or more example embodiments. Referring to FIG. 2A, at step 201, dynamic event inspection and securitization computing platform 110 may receive a first event from user device 130. In one example, the first event may be a request from a user of user device 130 to share data (e.g., files) with a remote computing device located outside of the enterprise network. Dynamic event inspection and securitization computing platform 110 may be configured to inspect and securitize event data (for example, the files that the user is requesting to share with the remote computing device located outside of the enterprise network) prior to authorizing execution of the first event (for example, the sending of the files by the user of user device 130 to the remote computing device located outside of the enterprise network).

At step 202, dynamic event inspection and securitization computing platform 110 may generate a user interface based on the first event received by dynamic event inspection and securitization computing platform 110 from user device 130 at step 201. Continuing with the example discussed above with reference to step 201 (e.g., the first event may be a request from a user of user device 130 to share data (e.g., files) with a remote computing device located outside of the enterprise network), the user interface generated by dynamic event inspection and securitization computing platform 110 at step 202 may be a securitized file sharing user interface. The securitized file sharing user interface may be configured to receive one or more files for secure sharing to a remote computer system located outside of an enterprise network.

Referring to FIG. 3A, an exemplary securitized file sharing user interface 300 that may be generated by dynamic event inspection and securitization computing platform 110 is illustrated. As stated above, dynamic event inspection and securitization computing platform 110 may generate securitized file sharing user interface 300 at step 202 in response to receiving the first event data from user device 130 at step 201. Securitized file sharing user interface 300 may include a file upload section 310, a password selection section 320, and an additional data section 330. In file upload section 300 of securitized file sharing user interface 300, a user may upload one or more files that the user is requesting to securely share with a remote computing device outside of the enterprise organization. In password selection section 320, the user may enter a password for each of corresponding uploaded files in file upload section 300. The passwords entered by the user in password selection section 320 may be required to meet password security requirements determined by the enterprise organization (or dynamic event inspection and securitization computing platform 110). For example, the password security requirements may include a minimum password length, and each of at least one lowercase alphabetic character, at least one uppercase alphabetic character, at least one numeric character, and at least one symbol. In some instances, other password requirements may be implemented. If dynamic event inspection and securitization computing platform 110 determines that the password entered by the user does not meet those password security requirements, dynamic event inspection and securitization computing platform 110 may prompt the user to select a different password that does meet the password security requirements. In additional data section 330, the user may enter additional data requested by dynamic event inspection and securitization computing platform 110. For example, dynamic event inspection and securitization computing platform 110 may request that the user enter, via securitized file sharing user interface 300, the destination for the user files (e.g., the remote computer system located outside of the enterprise organization). Although only one data field is shown in additional data section 330 of securitized file sharing user interface 300, in some instances, a greater number of fields, each requesting different data, could be included in the additional fields section 330 of securitized file sharing user interface 300.

Figure 2B:
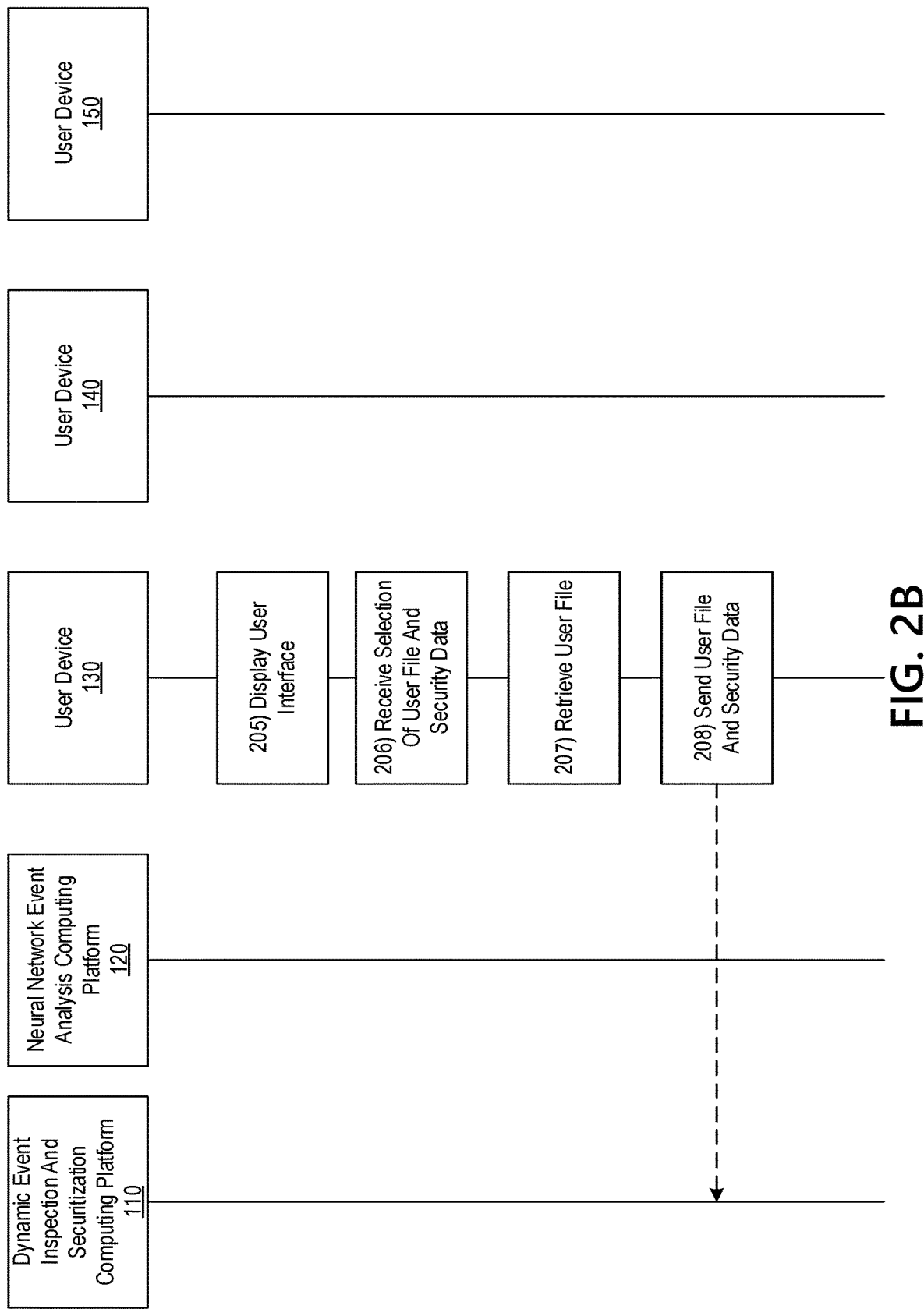

Referring back to FIG. 2A, at step 203, dynamic event inspection and securitization computing platform 110 may send the securitized file sharing user interface generated at step 202 to user device 130. The sending of the securitized file sharing user interface by dynamic event inspection and securitization computing platform 110 to user device 130 may cause user device 130 to display the securitized file sharing user interface. Specifically, at step 204, user device 130 may receive the securitized file sharing user interface sent by dynamic event inspection and securitization computing platform 110 at step 203. Referring to FIG. 2B, at step 205, user device 130 may display the securitized file sharing user interface on a display device of user device 130. At step 206, user device 130 may receive, via the securitized file sharing user interface displayed by user device 130 at step 205, a selection of one or more user files and security data associated with the one or more user files. For example, the security data may comprise one or more passwords for the one or more user files selected by the user. The user files may be user files that a user of user device 130 is requesting to securely share with a remote computing device located outside of the enterprise organization. The security data may further include the additional data entered by the user in the additional data section 330 of securitized file sharing user interface 300, such as the destination for the user files.

Figure 2C:
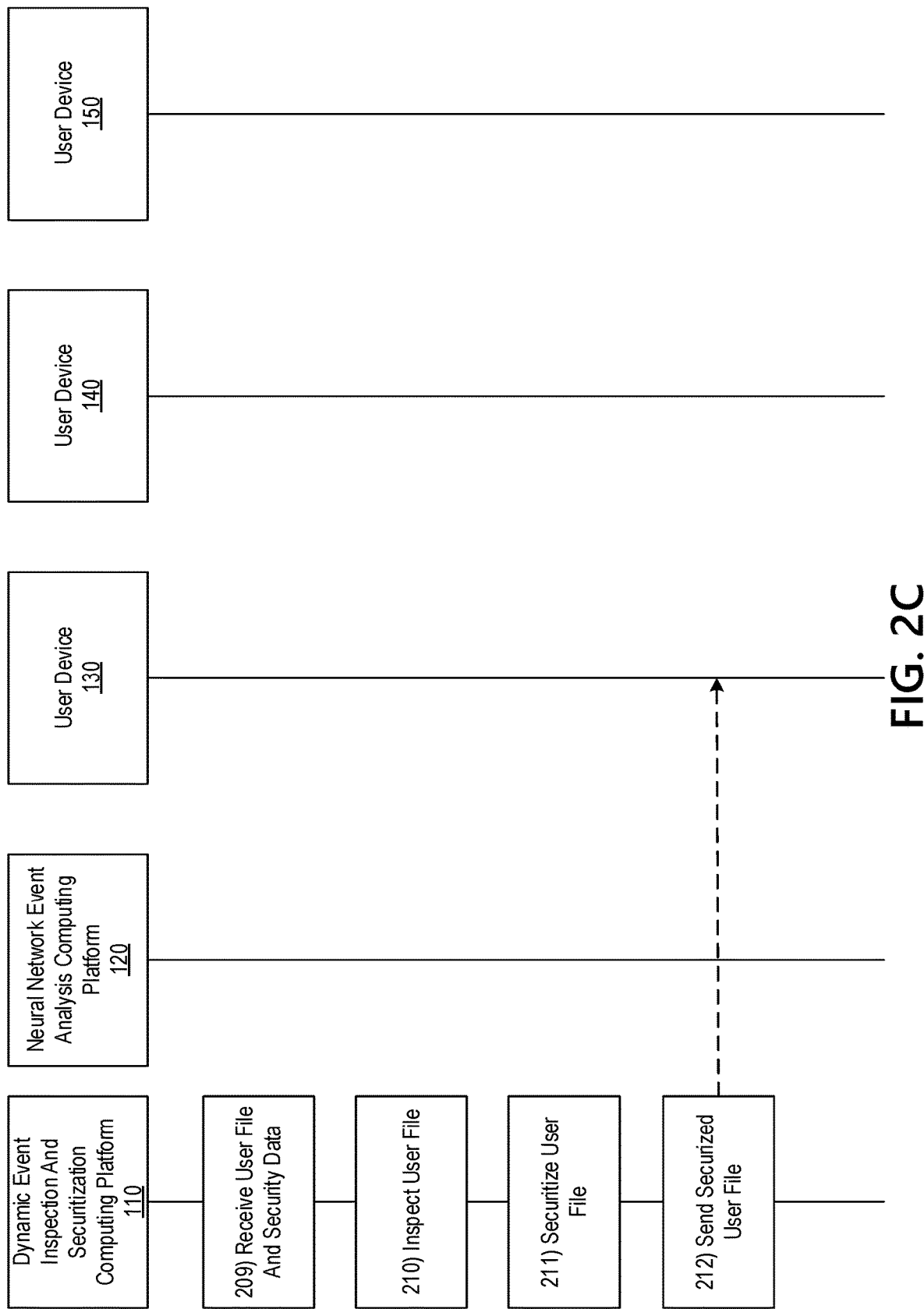

At step 207, user device 130 may retrieve the user files selected by the user at step 206 via the securitized file sharing user interface. If the user files are stored locally on user device 130, user device 130 may retrieve the files from local memory. If the user files are stored remotely from user device 130, user device 130 may retrieve the user files from remote storage (e.g., via network 160). At step 208, user device 130 may send the retrieved user files and corresponding security data to dynamic event inspection and securitization computing platform 110. Referring to FIG. 2C, at step 209, dynamic event inspection and securitization computing platform 110 may receive the user files and the security data sent from user device 130 to dynamic event inspection and securitization computing platform 110 at step 208.

At step 210, dynamic event inspection and securitization computing platform 110 may inspect the user files. For example, dynamic event inspection and securitization computing platform 110 may inspect the user files to determine whether the user files include any encrypted data. In another example, dynamic event inspection and securitization computing platform 110 may inspect the user files to determine whether the user files include any secure data that is not authorized for sharing with remote computer systems located outside the enterprise organization. If dynamic event inspection and securitization computing platform 110 determines, as a result of its inspection at step 210, that the user files received by dynamic event inspection and securitization computing platform 110 from user device 130 do not contain encrypted data or otherwise unauthorized data, processing may continue to step 211. If dynamic event inspection and securitization computing platform 110 determines, as a result of its inspection at step 210, that the user files received by dynamic event inspection and securitization computing platform 110 from user device 130 do contain encrypted data or otherwise unauthorized data, processing may return to step 202, where dynamic event inspection and securitization computing platform 110 may generate a modified securitized file sharing user interface. The modified securitized file sharing user interface may be similar to that depicted in FIG. 3A, but may additionally indicate that the user files previously selected by the user contained encrypted and/or unauthorized data. Dynamic event inspection and securitization computing platform 110 may then send the modified securitized file sharing user interface to user device 130, and the selection and transmission of user files and security data may be repeated until dynamic event inspection and securitization computing platform 110 determines that the user has selected files that do not contain any encrypted and/or unauthorized data.

At step 211, in response to dynamic event inspection and securitization computing platform 110 determining, at step 210, that the user files received by dynamic event inspection and securitization computing platform 110 from user device 130 at step 209 do not contain encrypted data or otherwise unauthorized data, dynamic event inspection and securitization computing platform 110 may securitize the user files received by dynamic event inspection and securitization computing platform 110 from user device 130. For example, dynamic event inspection and securitization computing platform 110 may securitize the user files received by dynamic event inspection and securitization computing platform 110 from user device 130 by encrypting the user files. In one example, dynamic event inspection and securitization computing platform 110 may select the particular encryption algorithm to be used to securitize the user files based on user selections made in securitized file sharing user interface 300 (for example, the user may be given the option to select the encryption algorithm in additional data section 330). In another example, dynamic event inspection and securitization computing platform 110 may select the particular encryption algorithm to be used to securitize the user files based on the contents of the user files. In another example, dynamic event inspection and securitization computing platform 110 may select the particular encryption algorithm to be used to securitize the user files based on the destination of the user files. In another example, dynamic event inspection and securitization computing platform 110 may select the particular encryption algorithm to be used based on the user associated with the user files (e.g., the user requesting to send the user files to the remote computer system located outside the enterprise organization). In yet another example, dynamic event inspection and securitization computing platform 110 may select the particular encryption algorithm to be used based on a combination, or weighted combination, of these aforementioned factors (e.g., user selections, contents of the user files, destination of the user files, user associated with the user files). In some instances, dynamic event inspection and securitization computing platform 110 may use additional or alternative factors when determining the particular encryption algorithms to be used by dynamic event inspection and securitization computing platform 110 to securitize the data files. Dynamic event inspection and securitization computing platform 110 may apply one or more encryption algorithms to the user files to generate corresponding securitized user files.

Figure 2D:
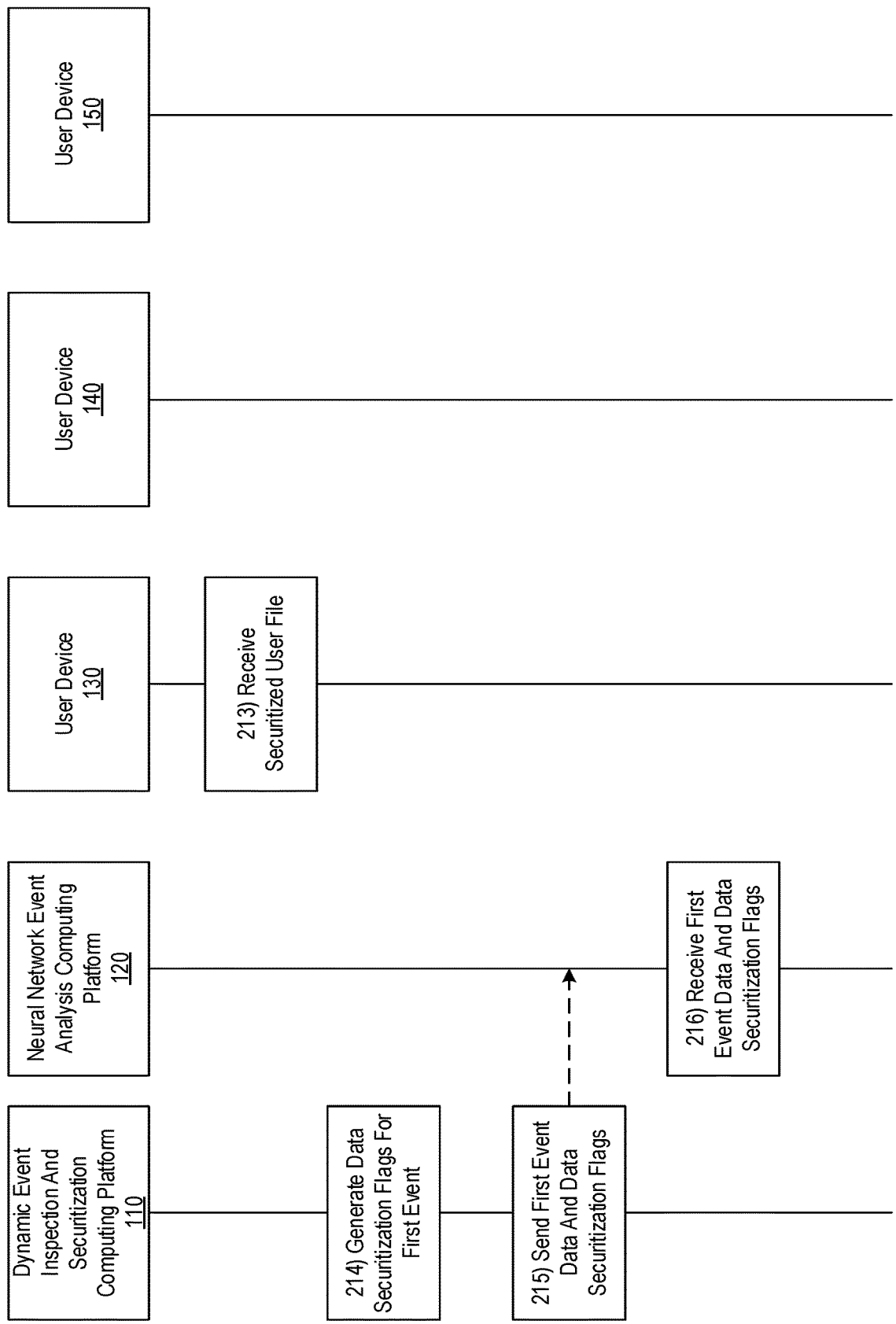

At step 212, dynamic event inspection and securitization computing platform 110 may authorize execution of the first event by sending the securitized user files to user device 130. Referring to FIG. 2D, user device 130 may receive, at step 213 and from dynamic event inspection and securitization computing platform 110, the securitized user files. User device 130 may then send the securitized user files to a remote computer system located outside the enterprise organization. User device 130 may further send the password data (e.g., the password data selected by the user via securitized file sharing user interface 300 at step 206) to the remote computer system in a separate communication.

At step 214, dynamic event inspection and securitization computing platform 110 may generate one or more data securitization flags for the first event data received by dynamic event inspection and securitization computing platform 110 from user device 130 at step 201. Dynamic event inspection and securitization computing platform 110 may generate the data securitization flags based on the securitization performed by dynamic event inspection and securitization computing platform 110 at step 211. For example, if dynamic event inspection and securitization computing platform 110 performs file encryption at step 211 to securitize the user file, dynamic event inspection and securitization computing platform 110 may generate a data encryption securitization flag indicating that the encrypted data file was generated by dynamic event inspection and securitization computing platform 110.

As discussed in detail below, dynamic event inspection and securitization computing platform 110 may include one or more event analysis modules. Specifically, as discussed below with reference to step 217, neural network event analysis computing platform 120 may input event data into one or more event analysis modules to analyze the event. The event analysis modules utilized by neural network event analysis computing platform 120 to analyze the event may include a content analysis module, an obfuscation analysis module, a user activity analysis module, a target domain analysis module, and/or a user access analysis module. In response to neural network event analysis computing platform 120 inputting the event data into the event analysis modules, neural network event analysis computing platform 120 may receive analysis results from the event analysis modules as a result of the analysis performed by those event analysis modules. And as further discussed below with reference to step 218, neural network event analysis computing platform 120 may modify the analysis results generated by the event analysis modules of neural network event analysis computing platform 120 based on the data securitization flags generated by dynamic event inspection and securitization computing platform 110 and one or more data security rules. The data security rules may define, for each possible type of data securitization flag, the modification to be made for that data securitization flag. The data securitization flags may indicate that particular actions performed by dynamic event inspection and securitization computing platform 110 (for example, the securitization of data) may necessitate the modification of analysis outputs of particular event analysis modules.

Thus, the one or more data securitization flags generated by dynamic event inspection and securitization computing platform 110 for the first event may be associated with those one or more analysis modules. For example, dynamic event inspection and securitization computing platform 110 may determine that the encryption of the user files at step 211 may result in an inaccurate output (e.g., risk score) for a particular factor (e.g., encrypted files) for a particular event analysis module (e.g., an obfuscation analysis module). In order to correct the inaccurate output, dynamic event inspection and securitization computing platform 110 may preemptively generate one or more data securitization flags for the first event associated with a particular factor of a particular event analysis module (discussed in additional detail below).

At step 215, dynamic event inspection and securitization computing platform 110 may send event data and the data securitization flags generated by dynamic event inspection and securitization computing platform 110 at step 215 to neural network event analysis computing platform 120. The first event data may include all of the first event data received by dynamic event inspection and securitization computing platform 110 at step 201 or a subset of the first event data received by dynamic event inspection and securitization computing platform 110 at step 201. The first event data may additionally include the user files and the security data (or a subset thereof) received by dynamic event inspection and securitization computing platform 110 from user device 130 at step 209. The first event data may further include a result of the inspection performed by dynamic event inspection and securitization computing platform 110 at step 210. For example, if dynamic event inspection and securitization computing platform 110 determined, at step 210, that the user files did not include encrypted data and/or unauthorized data, the first event data may include data indicative of this finding. The first event data may further include the securitized user files generated by dynamic event inspection and securitization computing platform 110 at step 211, as well as information indicative of the particular encryption algorithm(s) used by dynamic event inspection and securitization computing platform 110 to generate the securitized user files. At step 216, neural network event analysis computing platform 120 may receive the first event data and the data securitization flags sent by dynamic event inspection and securitization computing platform 110 at step 215.

Figure 2E:
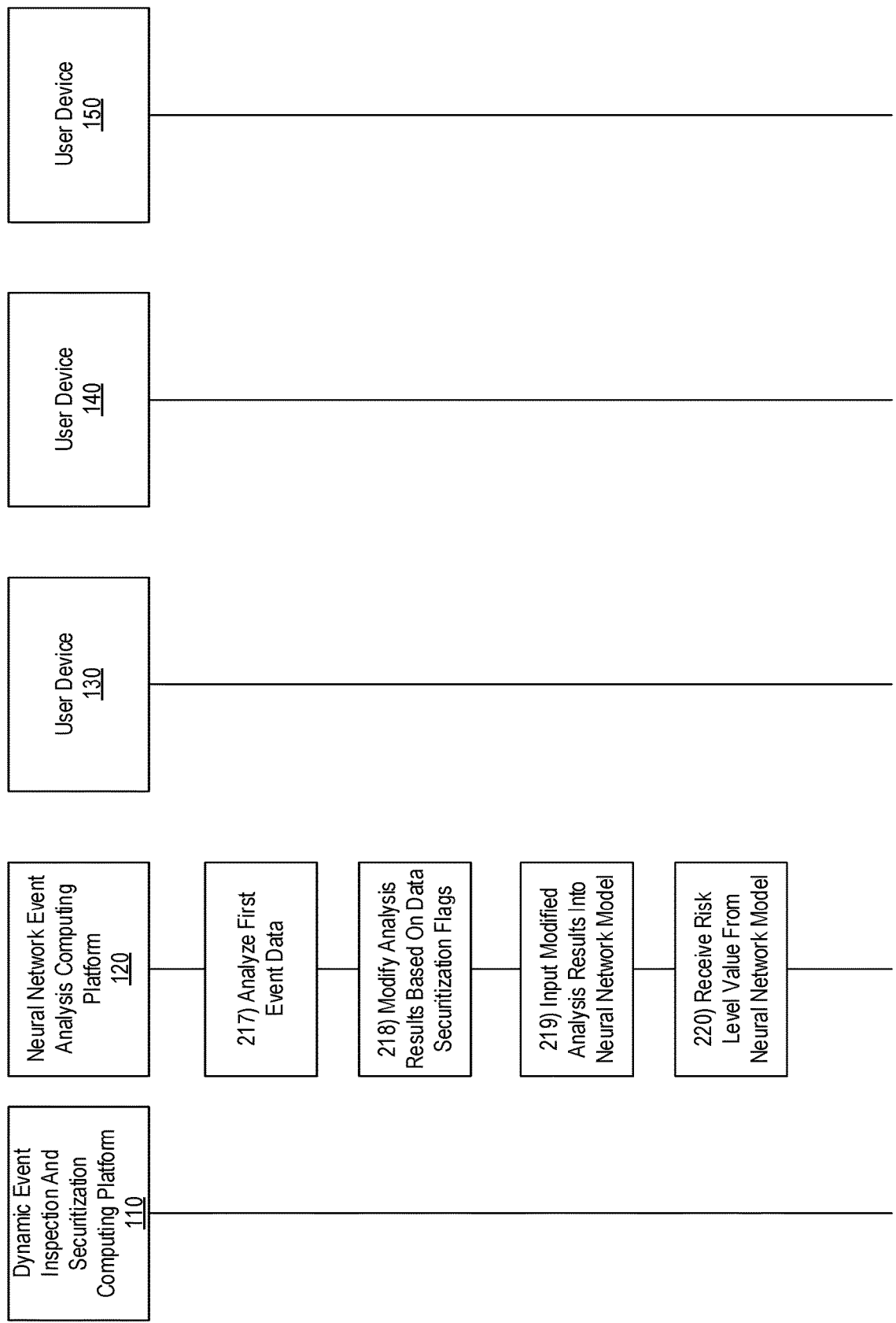
Figure 2G:
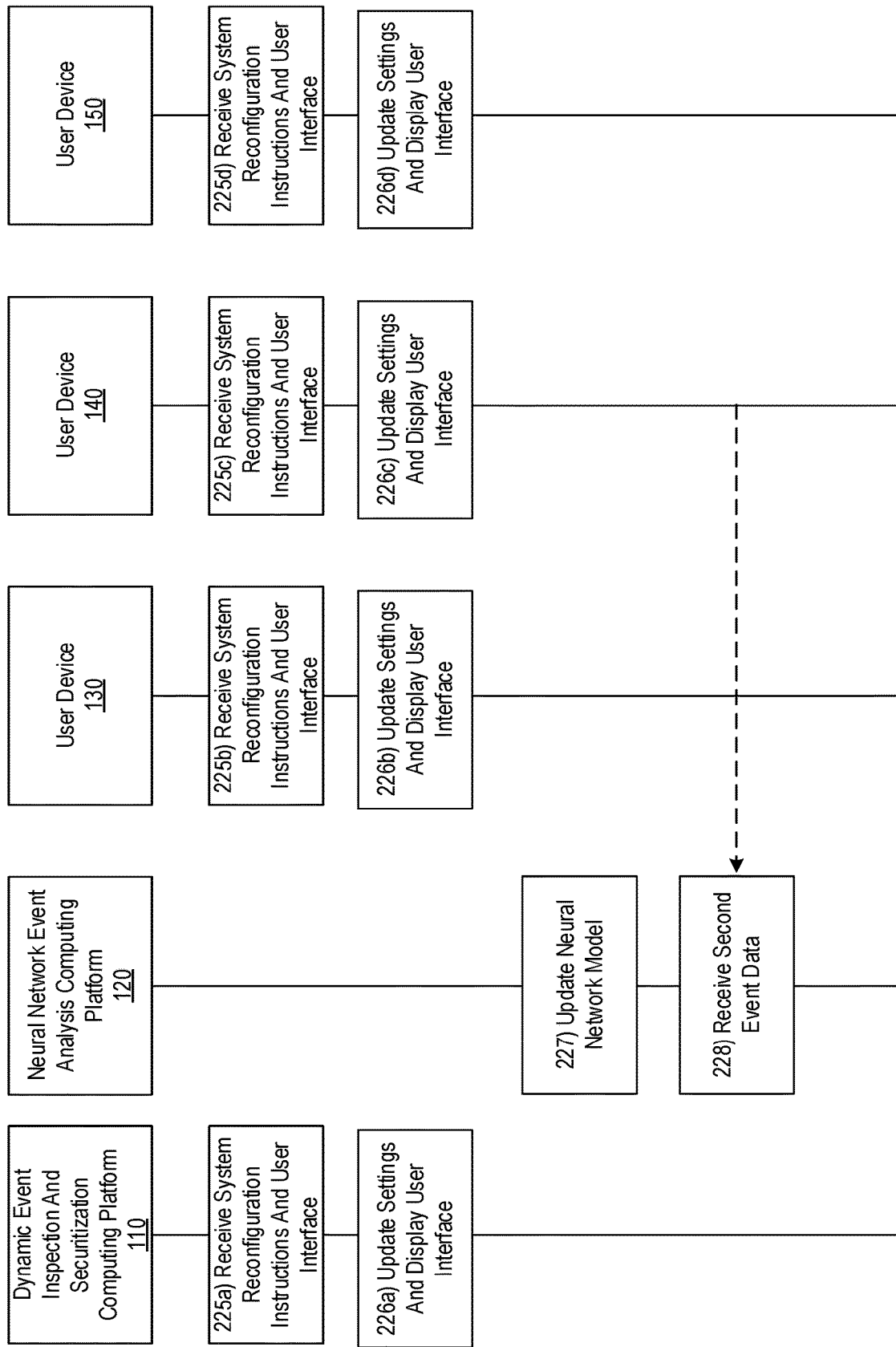

Referring to FIG. 2E, at step 217, neural network event analysis computing platform 120 may analyze the first event using the first event data received from dynamic event inspection and securitization computing platform 110. Neural network event analysis computing platform 120 may analyze the first event using one or more event analysis modules. For example, dynamic event inspection and securitization computing platform 110 may use a first event analysis module to analyze the first event, such as a content analysis module. The content analysis module of neural network event analysis computing platform 120 may analyze the contents of the first event (and first event data) to generate a first risk score for the first event. Analysis of the contents of the first event and the first event data may include an analysis of keywords, file types, file sources, file destinations, event type, and/or the like.

In another example, dynamic event inspection and securitization computing platform 110 may use a second event analysis module to analyze the first event, such as an obfuscation analysis module. Neural network event analysis computing platform 120 may employ the obfuscation analysis module to analyze the first event and the first event data to analyze data obfuscation factors. These data obfuscation factors may include, but are not limited to, manual modification of file extensions, multi-level file embedding, files nested within multilayer compressed folders, entropy values of files, files that are encrypted and/or password protected, files with particular encoders, files embedded within an object, unknown file types (e.g., files with unknown headers), file sizes, and/or the like. The obfuscation analysis module of neural network event analysis computing platform 120 may analyze the first event and the first event data for all of these factors. The obfuscation analysis module of neural network event analysis computing platform 120 may output a risk score for each of the aforementioned factors.

In another example, dynamic event inspection and securitization computing platform 110 may use a third event analysis module to analyze the first event, such as a user activity analysis module. The user activity analysis module may analyze the first event and the first event data to analyze one or more factors related to the user associated with the first event (e.g., the user requesting to share user files with a remote computer system located outside the enterprise network). For example, the user activity analysis module may analyze historical data associated with the user for factors such as whether the user has previously been associated with high-risk events, the time of the first event relative to the user's working hours, the communication history between the user and the recipient of the data, and/or the like. The user activity analysis module of neural network event analysis computing platform 120 may output a risk score for each of the aforementioned factors.

In another example, dynamic event inspection and securitization computing platform 110 may use a fourth event analysis module to analyze the first event, such as a target domain analysis module. The target domain analysis module may analyze the first event and the first event data to analyze one or more factors related to the recipient associated with the first event (e.g., the recipient of the user files, which may be a computer system, a domain, an individual, or the like).

For example, the target domain analysis module may analyze factors such as whether the recipient is associated with a vendor known to the enterprise organization, the history of the domain (e.g., how long the domain has been registered for), prior communications with the recipient, and/or the like. The target domain analysis module of neural network event analysis computing platform 120 may output a risk score for each of the aforementioned factors.

In another example, dynamic event inspection and securitization computing platform 110 may use a fifth event analysis module to analyze the first event, such as a user access analysis module. The user access analysis module may analyze the first event and the first event data to analyze one or more factors related to the access rights of the user associated with the first event (e.g., the access rights and profile of the user requesting to share user files with a remote computer system located outside the enterprise network). For example, the user access analysis module may analyze factors such as which network systems the user has access to, the risk level of the network systems the user has access to, the number of enterprise accounts the user has access to, and/or the like. The user access analysis module of neural network event analysis computing platform 120 may output a risk score for each of the aforementioned factors Neural network event analysis computing platform 120 may analyze the first event data at step 217 using all of the event analysis modules discussed above or a subset of the event analysis modules discussed above. In one example, the particular event analysis modules to be used by neural network event analysis computing platform 120 in its analysis at step 217 may be preconfigured. In another example, neural network event analysis computing platform 120 may dynamically determine which event analysis modules to use to perform the analysis at step 217. Neural network event analysis computing platform 120 may make such a dynamic determination at step 217 based on the contents of the first event data. In yet another example, neural network event analysis computing platform 120 may receive, from dynamic event inspection and securitization computing platform 110 (or another computer system) a selection of the particular event analysis modules to be used by neural network event analysis computing platform 120 in its analysis of the first event data at step 217.

Neural network event analysis computing platform 120 may use the five event analysis modules (or a subset of the five event analysis modules) in its analysis at step 217 in parallel or serially. Neural network event analysis computing platform 120 may use the event analysis modules serially if an output of any event analysis module is to be used as an input to another event analysis module. If neural network event analysis computing platform 120 uses the five event analysis modules in parallel, neural network event analysis computing platform 120 may, at step 217, input the first event data received by neural network event analysis computing platform 120 from dynamic event inspection and securitization computing platform 110 at step 216 into each of the five event analysis modules in parallel. If neural network event analysis computing platform 120 uses the event analysis modules serially, neural network event analysis computing platform 120 may input the first event data received by neural network event analysis computing platform 120 from dynamic event inspection and securitization computing platform 110 at step 216 into a subset of the event analysis modules.

In response to neural network event analysis computing platform 120 inputting the first event data into the event analysis modules, neural network event analysis computing platform 120 may receive outputs from the event analysis modules as a result of the analysis performed by those event analysis modules. As discussed above, each event analysis module may output risk scores for a plurality of factors associated with that event analysis module. For example, the first event analysis module (which may be a content analysis module), may generate a risk score for the content of the first event data. In a second example, the second event analysis module (which may be an obfuscation analysis module), may output a risk score for each of a plurality of factors, such as manual modification of file extensions, multi-level file embedding, files nested within multilayer compressed folders, entropy values of files, files that are encrypted and/or password protected, files with particular encoders, files embedded within an object, unknown file types (e.g., files with unknown headers), file sizes, and/or the like. In a third example, the third event analysis module (which may be a user activity analysis module), may output a risk score for each of a plurality of factors, such as whether the user has previously been associated with high-risk events, the time of the first event relative to the user's working hours, the communication history between the user and the recipient of the data, and/or the like. In a fourth example, the fourth event analysis module (which may be a target domain analysis module), may output a risk score for each of a plurality of factors such as whether the recipient is associated with a vendor known to the enterprise organization, the history of the domain (e.g., how long the domain has been registered for), prior communications with the recipient, and/or the like. In a fifth example, the fifth event analysis module (which may be a user access analysis module), may output a risk score for each of a plurality of factors such as which network systems the user has access to, the risk level of the network systems the user has access to, the number of enterprise accounts the user has access to, and/or the like.

At step 218, neural network event analysis computing platform 120 may modify the analysis results generated by the event analysis modules of neural network event analysis computing platform 120 (e.g., the risk scores for each of the factors discussed above) based on the data securitization flags generated by dynamic event inspection and securitization computing platform 110 at step 214 and received by neural network event analysis computing platform 120 from dynamic event inspection and securitization computing platform 110 at step 216, to generate modified analysis results. Neural network event analysis computing platform 120 may modify the analysis results generated by the event analysis modules of neural network event analysis computing platform 120 based on one or more data security rules. The data security rules may define, for each possible type of data securitization flag, the modification to be made for that data securitization flag.

As discussed above, dynamic event inspection and securitization computing platform 110 may generate one or more data securitization flags at step 214 for the first event based on the securitization performed by dynamic event inspection and securitization computing platform 110 at step 211. For example, if dynamic event inspection and securitization computing platform 110 performs file encryption at step 211 to securitize the file, dynamic event inspection and securitization computing platform 110 may generate a data encryption securitization flag indicating that the encrypted data file was generated by dynamic event inspection and securitization computing platform 110. And as further discussed above with reference to the second event analysis module of neural network event analysis computing platform 120, the second event analysis module, which may be an obfuscation analysis module, may analyze factors such as whether the first event data includes encrypted files. Accordingly, a first data security rule may specify that if the data encryption securitization flag is generated by dynamic event inspection and securitization computing platform 110, neural network event analysis computing platform 120 is to modify the risk score associated with the encryption factor output by the second event analysis module of neural network event analysis computing platform 120. A person of ordinary skill would understand that neural network event analysis computing platform 120 would generate different data security rules based on the different types of securitization that may be performed by dynamic event inspection and securitization computing platform 110 and based on the different factors that are considered by the event analysis modules of neural network event analysis computing platform 120.

At step 219, neural network event analysis computing platform 120 may input the modified analysis results generated by neural network event analysis computing platform 120 at step 218 into a neural network model. The neural network model may include an input layer (e.g., the modified analysis results generated by neural network event analysis computing platform 120 at step 218), one or more hidden layers, and an output layer. The one or more hidden layers may be trained by neural network event analysis computing platform 120 using data sets comprising historical event data. The one or more hidden layers may be configured to assigned weights to each of the inputs of the neural network model. Each event analysis module may be associated with a different node of the hidden layers of the neural network. Additional nodes of the hidden layers of the neural network may be associated with a combination of one or more event analysis modules. These additional nodes may be configured to analyze the interrelationships between the different factors discussed above with reference to the five event analysis modules of neural network event analysis computing platform 120, and how the different risk scores for the different factors of an event affect the total risk level of the event. The nodes of the hidden layers may be configured to assign weights to the inputted risk scores for the different factors of the different event analysis modules. The output layer may be configured to output a risk level value that is a combination of the weighted risk scores. At step 220, neural network event analysis computing platform 120 may receive a risk level value from the neural network model. As discussed above, the risk level value outputted by the neural network model of neural network event analysis computing platform 120 may be a combination of the weighted risk scores generated by the neural network model.

Referring to FIG. 2F, at step 221, neural network event analysis computing platform 120 may input the risk level value received as an output from the neural network model of neural network event analysis computing platform 120 to a decision engine of neural network event analysis computing platform 120. The decision engine of neural network event analysis computing platform 120 may include a risk level matrix that is used to map different combinations of weighted risk scores to different reactionary commands. As discussed above, the risk level value outputted by the neural network model of neural network event analysis computing platform 120 may be a combination of the weighted risk scores generated by nodes of the neural network model. The decision engine may map the combination of weighted risk scores in the risk level value to the matching combination of weighted risk scores in the risk level matrix of the decision engine. The decision engine may then identify the reactionary commands assigned to the matching combination of weighted risk scores. The reactionary commands may be temporary or permanent. For example, the reactionary command may be a temporary access restriction on the user associated with the first event. In another example, the reactionary command may be a permanent blocking of traffic to an external target domain. In yet another example, the reactionary command may be a temporary blocking of similar event types. In another example, the reactionary command may be an escalation of the event to a manager or administrator of the enterprise organization. At step 222, neural network event analysis computing platform 120 may receive the reactionary commands from the decision engine of neural network event analysis computing platform 120.

At step 223, neural network event analysis computing platform 120 may generate system reconfiguration instructions based on the reactionary commands received from the decision engine of neural network event analysis computing platform 120 at step 222. The system reconfiguration instructions may be software instructions which, when implemented by one or more computer systems of the enterprise organization, modify the security settings of those computer systems. At step 224, neural network event analysis computing platform 120 may send the system reconfiguration instructions to one of more computer systems of the enterprise organization, such as dynamic event inspection and securitization computing platform 110, user device 130, user device 140, and/or user device 150. Although FIG. 2F shows neural network event analysis computing platform 120 sending the system reconfiguration instructions to four computer systems (dynamic event inspection and securitization computing platform 110, user device 130, user device 140, and/or user device 150), the particular number of computer systems to which the system reconfiguration instructions are sent may, in some instances, be dependent on the particular reactionary commands and/or system reconfiguration instructions.

Figure 3B:

At step 223, neural network event analysis computing platform 120 may further generate a user interface to be sent to the computer systems. Referring to FIG. 3B, an illustrative user interface that may be generated by neural network event analysis computing platform 120 and sent along with the system reconfiguration instructions is shown. The graphical user interface 350 may include a first informational section 360 that includes information about the event that is triggering the modification of the security settings of the computer system. The information may include the event type, the event time, the target domain of the event, and/or the like. Graphical user interface 350 may further include a second informational section 370 that provides information of the modified security settings. For example, if communication with a target domain is being blocked by the system reconfiguration instructions, second informational section 370 may indicate as such.

At step 224, neural network event analysis computing platform 120 may send the system reconfiguration instructions generated by neural network event analysis computing platform 120 at step 223 and the user interface generated by neural network event analysis computing platform 120 at step 223 to one or more computer systems. The sending of the system reconfiguration instructions and the user interface from neural network event analysis computing platform 120 to the computer systems (such as dynamic event inspection and securitization computing platform 110, user device 130, user device 140, and/or user device 150) may cause those computer systems to modify one or more security settings of the computer systems based on the system reconfiguration instructions generated by neural network event analysis computing platform 120 at step 224 and to display the user interface generated by neural network event analysis computing platform 120 at step 224. For example, referring to FIG. 2G, at steps 225*a-d*, each of dynamic event inspection and securitization computing platform 110, user device 130, user device 140, and/or user device 150 may receive the system reconfiguration instructions and the user interface from neural network event analysis computing platform 120. At steps 226*a-d*, each of dynamic event inspection and securitization computing platform 110, user device 130, user device 140, and/or user device 150 may modify one or more security settings based on the system reconfiguration instructions received from neural network event analysis computing platform 120 at steps 225*a-d* and may display the user interface received from neural network event analysis computing platform 120 at steps 225*a-d*.

At step 227, neural network event analysis computing platform 120 may update the neural network model. Neural network event analysis computing platform 120 may continuously update and train both the event analysis modules and the neural network model using feedback received from individuals and/or computer systems within the enterprise organization, such as dynamic event inspection and securitization computing platform 110, user device 130, user device 140, and/or user device 150. The feedback may be associated with particular factors, risk scores calculated for those factors, weighted risk scores calculated for those factors, or the risk level calculated for the event. Based on the particular factor, risk score, or weighted risk score, neural network event analysis computing platform 120 may train/update the corresponding event analysis module and/or the corresponding node(s) of the neural network model.

At step 228, neural network event analysis computing platform 120 may receive second event data from user device 140. The second event data may be associated with a second event. The second event may be similar to the first event (e.g., sending user files to a remote computer system outside the enterprise organization) or a different type of event, such as downloading files to user device 140, generating encrypted files, uploading files to a server, installing software applications on user device 140, and/or the like. The second event data may be similar to the first event data.

Figure 2H:
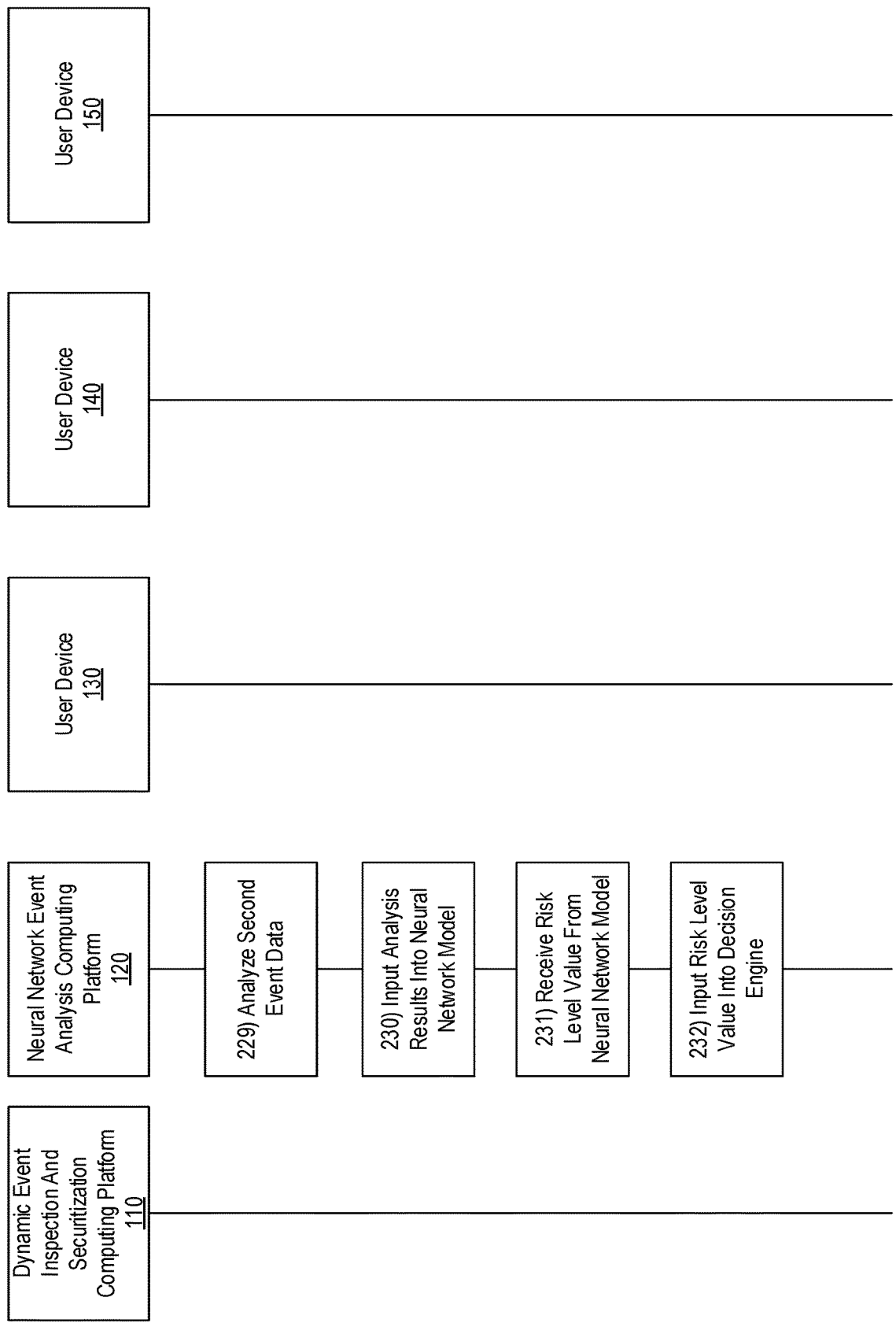

Referring to FIG. 2H, at step 229, neural network event analysis computing platform 120 may analyze the second event data received from user device 140. As discussed above with reference to step 217, neural network event analysis computing platform 120 may, at step 229, input the second event data into one or more event analysis modules to analyze the second event. The event analysis modules utilized by neural network event analysis computing platform 120 to analyze the second event at step 229 may include a content analysis module, an obfuscation analysis module, a user activity analysis module, a target domain analysis module, and/or a user access analysis module. In response to neural network event analysis computing platform 120 inputting the second event data into the event analysis modules, neural network event analysis computing platform 120 may receive analysis results from the event analysis modules as a result of the analysis performed by those event analysis modules. As discussed above, each event analysis module may output risk scores for a plurality of factors associated with that event analysis module. These factors may include, but are not limited to, the content of the second event data. manual modification of file extensions, multi-level file embedding, files nested within multilayer compressed folders, entropy values of files, compressed files that are encrypted and/or password protected, files with particular encoders, files embedded within an object, unknown file types, file sizes, whether the user has previously been associated with high-risk events, the time of the second event relative to the user's working hours, the communication history between the user and the recipient of the data, whether the recipient is associated with a vendor known to the enterprise organization, the history of the domain, prior communications with the recipient, the risk level of the network systems the user has access to, the number of enterprise accounts the user has access to, and/or the like.

Figure 2I:
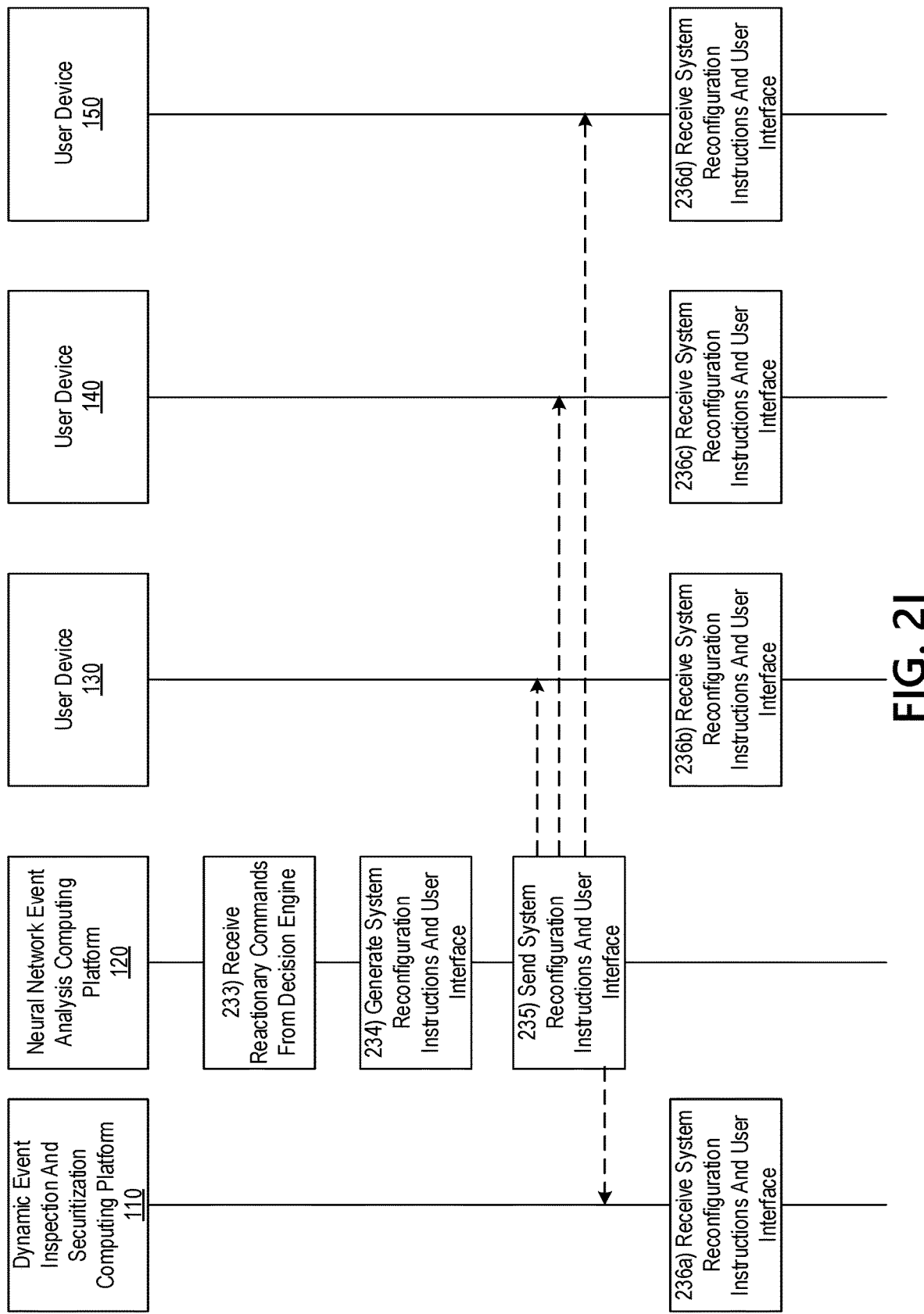

At step 230, neural network event analysis computing platform 120 may input the analysis results generated by the event analysis modules of neural network event analysis computing platform 120 at step 229 into the neural network model of neural network event analysis computing platform 120 (discussed above with reference to steps 219 and 220). At step 231, neural network event analysis computing platform 120 may receive a risk level value from the neural network model. As discussed above, the risk level value outputted by the neural network model of neural network event analysis computing platform 120 may be a combination of the weighted risk scores generated by the nodes of the neural network model. At step 232, neural network event analysis computing platform 120 may input the risk level value received as an output from the neural network model of neural network event analysis computing platform 120 at step 231 to the decision engine of neural network event analysis computing platform 120 (discussed above with reference to step 221). Referring to FIG. 2I, at step 233, neural network event analysis computing platform 120 may receive the reactionary commands from the decision engine of neural network event analysis computing platform 120 (discussed above with reference to steps 221 and 222). At step 234, neural network event analysis computing platform 120 may generate system reconfiguration instructions based on the reactionary commands received from the decision engine of neural network event analysis computing platform 120 at step 233 (discussed above with reference to step 223) and a user interface for display at the computer systems (discussed above with reference to step 223 and FIG. 3B).

At step 235, neural network event analysis computing platform 120 may send the system reconfiguration instructions generated by neural network event analysis computing platform 120 at step 234 and the user interface generated by neural network event analysis computing platform 120 at step 234 to one of more computer systems of the enterprise organization, such as dynamic event inspection and securitization computing platform 110, user device 130, user device 140, and/or user device 150 (discussed above with reference to step 224). The sending of the system reconfiguration instructions and the user interface from neural network event analysis computing platform 120 to the computer systems (such as dynamic event inspection and securitization computing platform 110, user device 130, user device 140, and/or user device 150) may cause those computer systems to modify one or more security settings of the computer systems based on the system reconfiguration instructions generated by neural network event analysis computing platform 120 at step 234 and to display the user interface generated by neural network event analysis computing platform 120 at step 234.

Figure 2J:
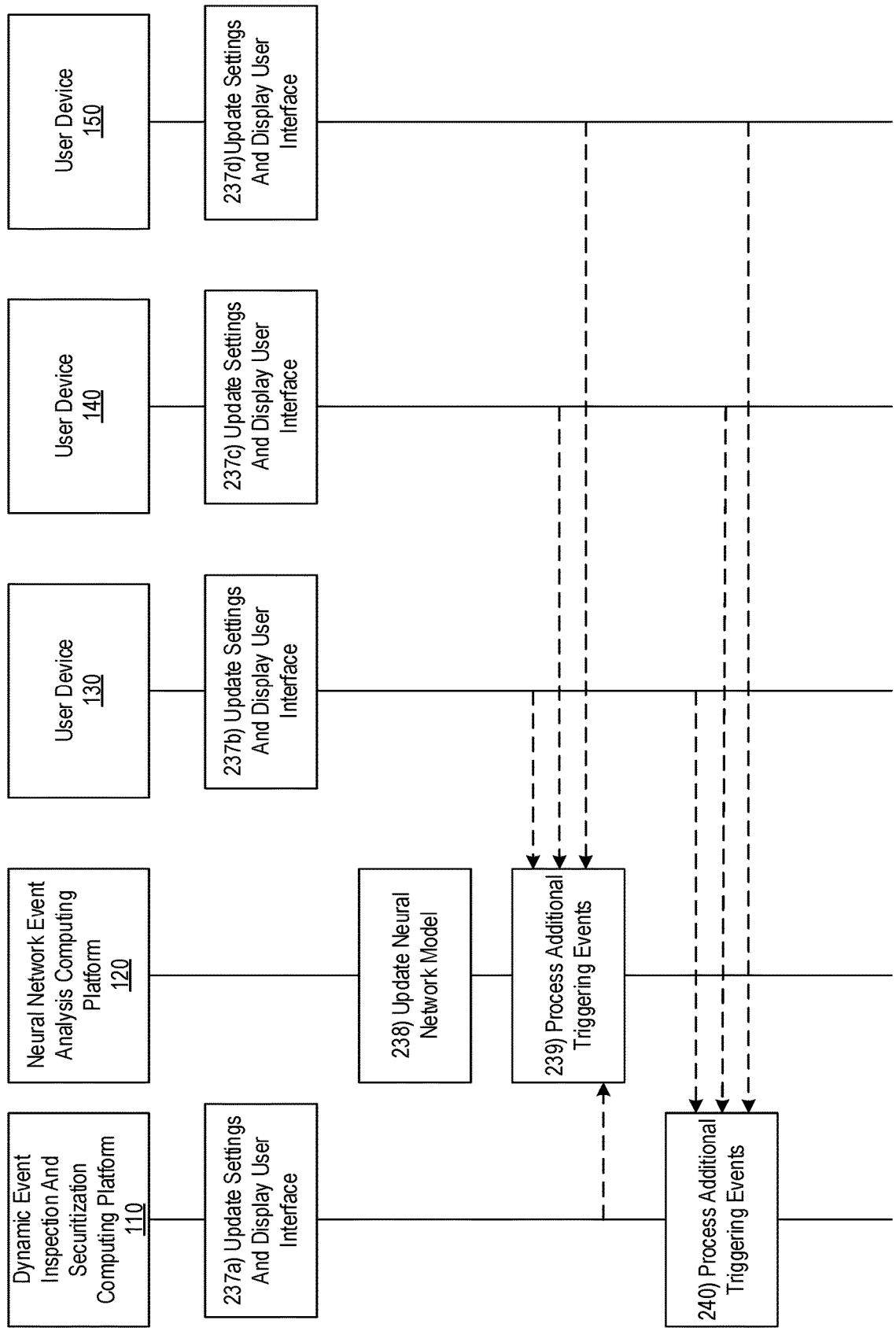

For example, at steps 236a-d, each of dynamic event inspection and securitization computing platform 110, user device 130, user device 140, and/or user device 150 may receive the system reconfiguration instructions and the user interface from neural network event analysis computing platform 120. Referring to FIG. 2J, at steps 237a-d, each of dynamic event inspection and securitization computing platform 110, user device 130, user device 140, and/or user device 150 may modify one or more security settings based on the system reconfiguration instructions received from neural network event analysis computing platform 120 at steps 236a-d and may display the user interface received from neural network event analysis computing platform 120 at steps 236a-d. At step 238, neural network event analysis computing platform 120 may update the neural network model based on feedback associated with the second event (discussed above with reference to step 227). At step 239, neural network event analysis computing platform 120 may continue to process additional events received from dynamic event inspection and securitization computing platform 110, user device 130, user device 140, and/or user device 150. At step 240, dynamic event inspection and securitization computing platform 110 may continue to process additional events received from user device 130, user device 140, and/or user device 150. These additional events may be similar to the first event and/or the second event, or may be different events.

Figure 4A:
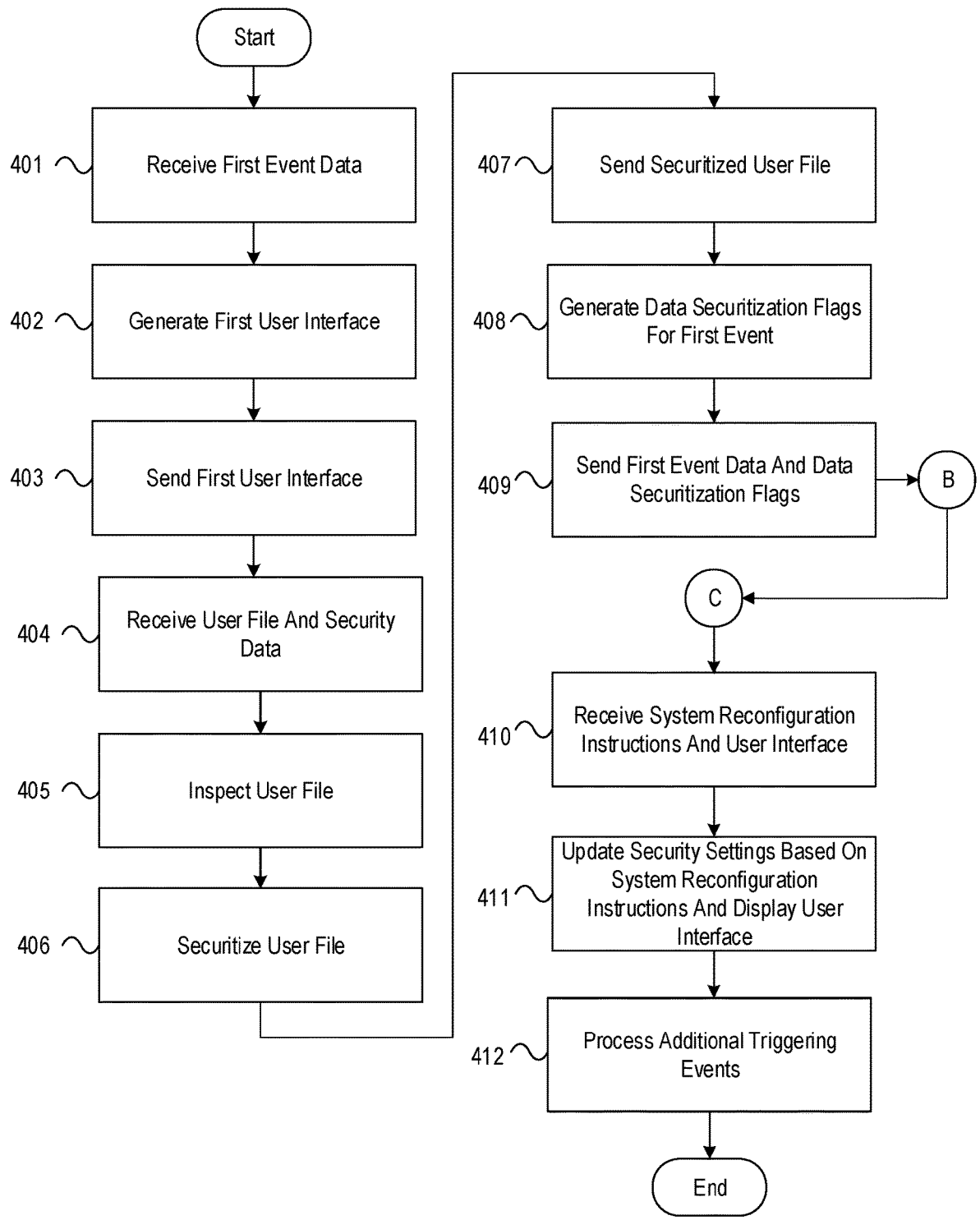
FIGS. 4A-4C depict an illustrative method for implementing a dynamic event securitization and neural network analysis system in accordance with one or more example embodiments.
Figure 4B:
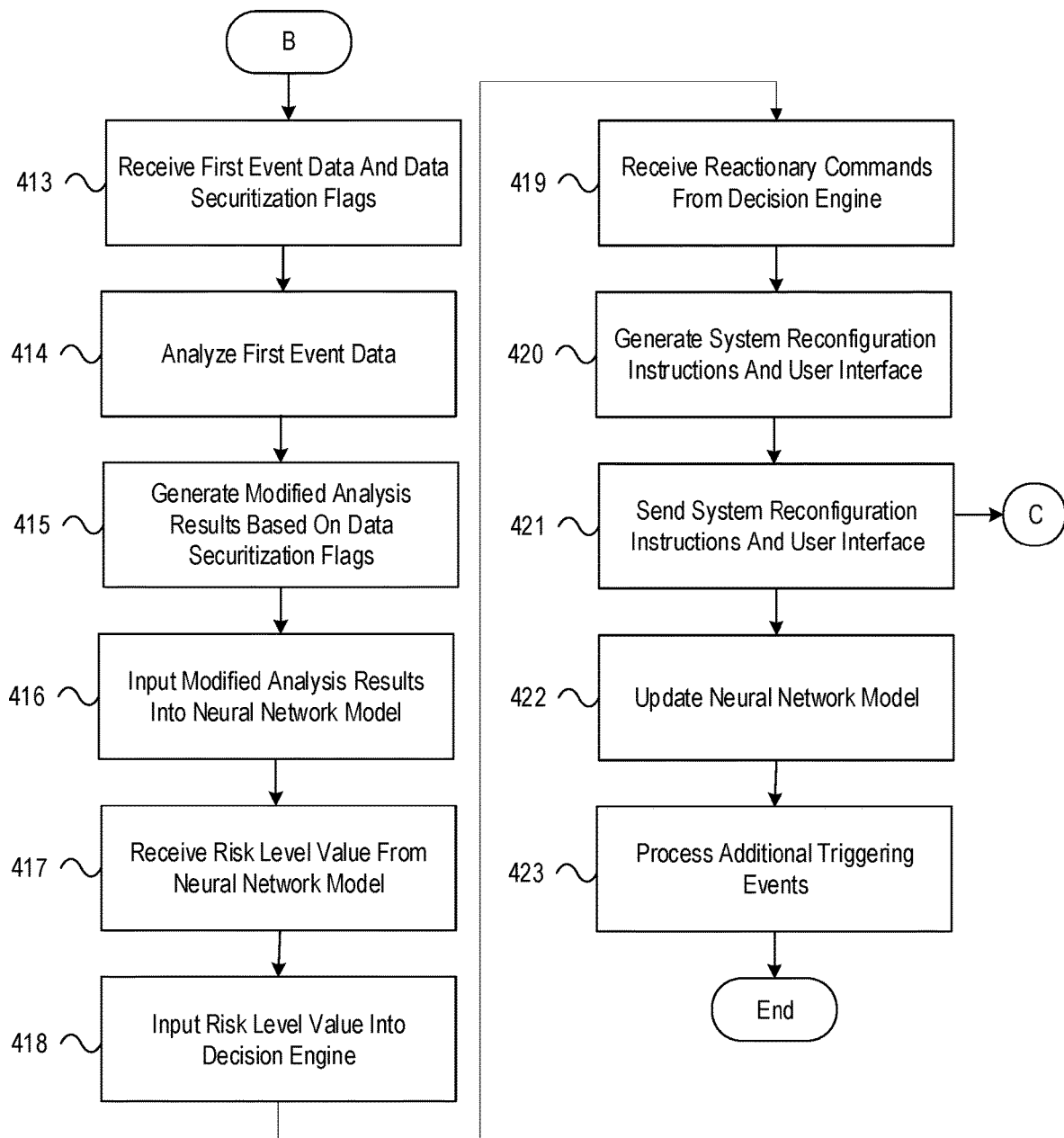
Figure 4C:
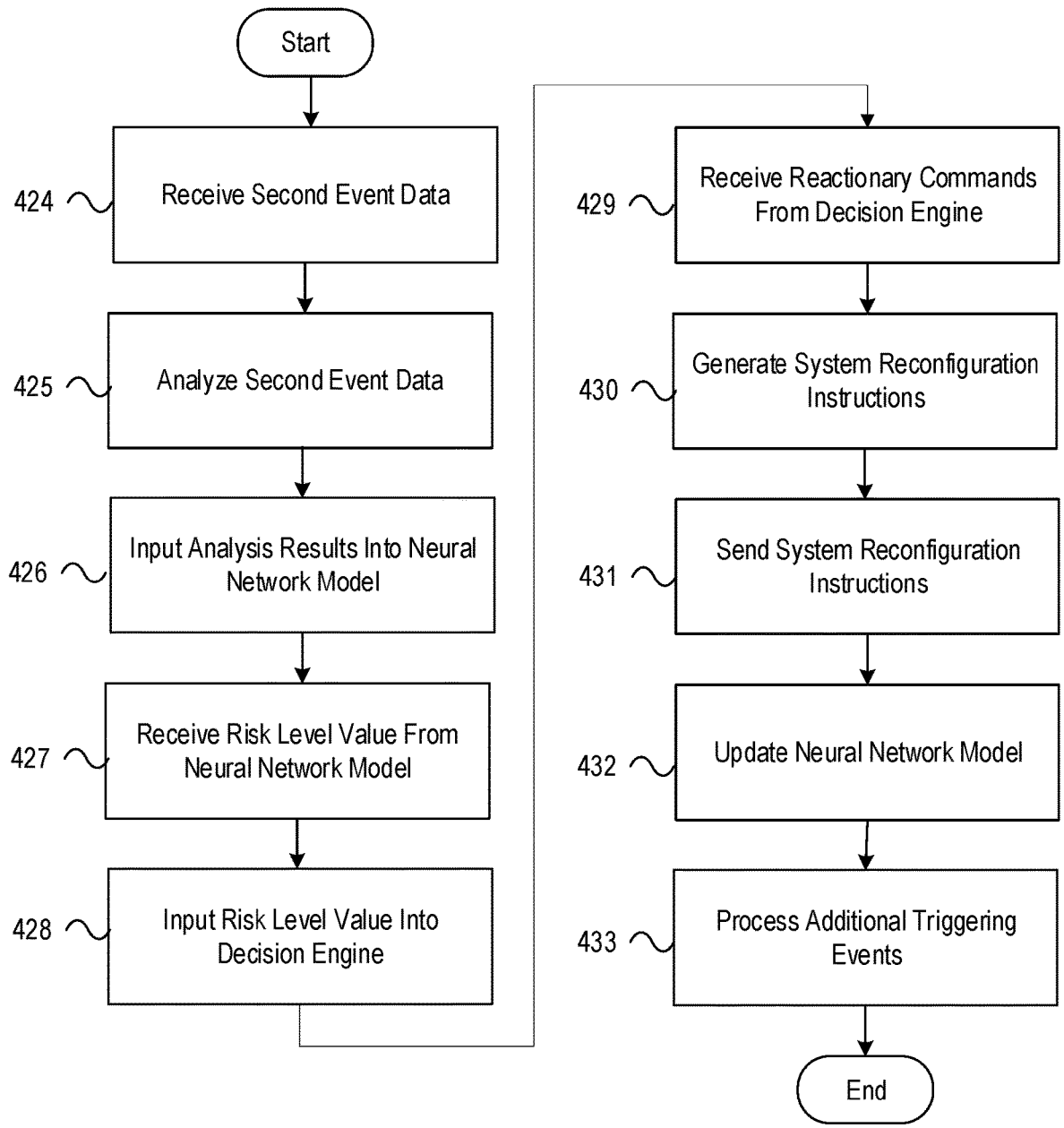

FIGS. 4A-4C depict an illustrative method for implementing a dynamic event securitization and neural network analysis system in accordance with one or more example embodiments. Referring to FIG. 4A, at step 401, a dynamic event inspection and securitization computing platform, part of a dynamic event securitization and neural network analysis system and having at least one processor, a communication interface, and memory, may receive first event from data a computer system. At step 402, the dynamic event inspection and securitization computing platform may generate a first user interface based on the first event data. At step 403, the dynamic event inspection and securitization computing platform may send the first user interface to the computer system. At step 404, the dynamic event inspection and securitization computing platform may receive one or more user files and corresponding security data from the computer system. At step 405, the dynamic event inspection and securitization computing platform may inspect the user files received by the dynamic event inspection and securitization computing platform at step 404. At step 406, the dynamic event inspection and securitization computing platform may securitize the user files received by the dynamic event inspection and securitization computing platform at step 404 to generate securitized user files. For example, the dynamic event inspection and securitization computing platform may securitize the user files received by the dynamic event inspection and securitization computing platform by encrypting the user files to generated encrypted user files. At step 407, the dynamic event inspection and securitization computing platform may send the securitized user files generated by the dynamic event inspection and securitization computing platform to the computer system. At step 408, the dynamic event inspection and securitization computing platform may generate data securitization flags for the first event. At step 409, the dynamic event inspection and securitization computing platform may send the first event data and the data securitization flags generated by the dynamic event inspection and securitization computing platform to a neural network event analysis computing platform (which may trigger execution of step 413 in FIG. 4B by the neural network event analysis computing platform). At step 410 (which may be triggered by completion of step 421 of FIG. 4B by the neural network event analysis computing platform), the dynamic event inspection and securitization computing platform may receive system reconfiguration instructions and a user interface from the neural network event analysis computing platform. At step 411, the dynamic event inspection and securitization computing platform may modify security settings of the dynamic event inspection and securitization computing platform based on the system reconfiguration instructions received from the neural network event analysis computing platform, and may display the user interface received from the neural network event analysis computing platform. At step 412, the dynamic event inspection and securitization computing platform may continue processing additional events received from computer systems of the enterprise organization.

Referring to FIG. 4B, at step 413, a neural network event analysis computing platform, part of the dynamic event securitization and neural network analysis system and having at least one processor, a communication interface, and memory, may receive the first event data and data securitization flags from the dynamic event inspection and securitization computing platform. At step 414, the neural network event analysis computing platform may analyze the first event data received from the dynamic event inspection and securitization computing platform using one or more event analysis modules of the neural network event analysis computing platform. The neural network event analysis computing platform may analyze the first event by inputting the first event data from the dynamic event inspection and securitization computing platform into the one or more event analysis modules of the neural network event analysis computing platform, and receiving analysis results (e.g., one or more risk scores) from the event analysis modules of the neural network event analysis computing platform. At step 415, the neural network event analysis computing platform may generate modified analysis results based on the data securitization flags received from the dynamic event inspection and securitization computing platform. At step 416, the neural network event analysis computing platform may input the modified analysis results generated by the neural network event analysis computing platform into a neural network model of the neural network event analysis computing platform. At step 417, the neural network event analysis computing platform may receive a risk level value as an output from the neural network model of the neural network event analysis computing platform based on the modified analysis results inputted by the neural network event analysis computing platform into the neural network model of the neural network event analysis computing platform. At step 418, the neural network event analysis computing platform may input the risk level value received as an output from the neural network model of the neural network event analysis computing platform to a decision engine of the neural network event analysis computing platform. At step 419, the neural network event analysis computing platform may receive reactionary commands from the decision engine of the neural network event analysis computing platform based on the risk level value inputted by the neural network event analysis computing platform into the decision engine of the neural network event analysis computing platform. At step 420, the neural network event analysis computing platform may generate system reconfiguration instructions for one or more computer systems based on the reactionary commands received from the decision engine of the neural network event analysis computing platform. The neural network event analysis computing platform may additionally generate a user interface based on the reactionary commands received from the decision engine of neural network event analysis computing platform. At step 421, the neural network event analysis computing platform may send the system reconfiguration instructions generated by the neural network event analysis computing platform and the user interface generated by the neural network event analysis computing platform to the computer systems (which may trigger execution of step 410 in FIG. 4A). The sending of the system configuration instructions by the neural network event analysis computing platform to the computer systems may cause the computer systems to modify one or more security settings of those computer systems based on the system configuration instructions generated by the neural network event analysis computing platform. The sending of the user interface by the neural network event analysis computing platform to the computer systems may cause the computer systems to display the user interface generated by the neural network event analysis computing platform. At step 422, the neural network event analysis computing platform may update the neural network model of the neural network event analysis computing platform based on feedback received for the event. The feedback may be associated with particular factors, risk scores calculated for those factors, weighted risk scores calculated for those factors, or the risk level calculated for the event. At step 423, the neural network event analysis computing platform may continue processing additional events received from computer systems of the enterprise organization.

Referring to FIG. 4C, at step 424, a neural network event analysis computing platform, part of the dynamic event securitization and neural network analysis system and having at least one processor, a communication interface, and memory, may receive second event data from a computer system. At step 425, the neural network event analysis computing platform may analyze the second event data received from the computer system using one or more event analysis modules of the neural network event analysis computing platform. The neural network event analysis computing platform may analyze the second event data received from the computer system by inputting the second event data into the one or more event analysis modules of the neural network event analysis computing platform, and receiving analysis results (e.g., one or more risk scores) from the event analysis modules of the neural network event analysis computing platform. At step 426, the neural network event analysis computing platform may input the analysis results into a neural network model of the neural network event analysis computing platform. At step 427, the neural network event analysis computing platform may receive a risk level value as an output from the neural network model of the neural network event analysis computing platform based on the analysis results input by the neural network event analysis computing platform into the neural network model of the neural network event analysis computing platform. At step 428, the neural network event analysis computing platform may input the risk level value received as an output from the neural network model of the neural network event analysis computing platform to a decision engine of the neural network event analysis computing platform. At step 429, the neural network event analysis computing platform may receive reactionary commands from the decision engine of the neural network event analysis computing platform based on the risk level value inputted by the neural network event analysis computing platform into the decision engine of the neural network event analysis computing platform. At step 430, the neural network event analysis computing platform may generate system reconfiguration instructions for one or more computer systems based on the reactionary commands received from the decision engine of the neural network event analysis computing platform. The neural network event analysis computing platform may additionally generate a user interface based on the reactionary commands received from the decision engine of neural network event analysis computing platform. At step 431, the neural network event analysis computing platform may send the system reconfiguration instructions generated by the neural network event analysis computing platform and the user interface generated by the neural network event analysis computing platform to the computer systems. The sending of the system configuration instructions by the neural network event analysis computing platform to the computer systems may cause the computer systems to modify one or more security settings of those computer systems based on the system configuration instructions generated by the neural network event analysis computing platform. The sending of the user interface by the neural network event analysis computing platform to the computer systems may cause the computer systems to display the user interface generated by the neural network event analysis computing platform. At step 432, the neural network event analysis computing platform may update the neural network model of the neural network event analysis computing platform based on feedback received for the event. The feedback may be associated with particular factors, risk scores calculated for those factors, weighted risk scores calculated for those factors, or the risk level calculated for the event. At step 433, the neural network event analysis computing platform continue processing additional events received from computer systems of the enterprise organization.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A system comprising:
a dynamic event securitization computing platform comprising:
a first processor;
a communication interface communicatively coupled to the first processor; and
memory storing computer-readable instructions that, when executed by the first processor, cause the dynamic event securitization computing platform to:
receive, from a user device, a first event;
generate, based on the first event, a securitized file-sharing user interface configured to receive one or more files for secure sharing to a remote computing device located outside of an enterprise network;
send, to the user device, the securitized file-sharing user interface;
receive, from the user device, one or more data files;
generate, based on a result of inspecting each of the one or more data files, a data securitization flag that causes a neural network analysis computing platform to modify event analysis results; and
send, to a neural network analysis computing platform, the data securitization flag and data associated with the first event; and
the neural network analysis computing platform, wherein the neural network analysis computing platform comprises:
a second processor;

a second communication interface communicatively coupled to the second processor; and second memory storing computer-readable instructions that, when executed by the second processor, cause the neural network analysis computing platform to:

receive, from the dynamic event securitization computing platform, the data securitization flag and the data associated with the first event;

analyze, using a plurality of event analysis modules, the data associated with the first event to generate analysis results;

modify, based on the data securitization flag, the analysis results to generate modified analysis results;

input the modified analysis results into a neural network model;

receive, from the neural network model, a risk level value associated with the first event;

input data associated with the risk level value into a decision engine, wherein inputting the data associated with the risk level value into the decision engine causes the decision engine to output one or more reactionary commands based on the risk level value; and generate system reconfiguration instructions associated with the one or more reactionary commands.

2. The system of claim 1, wherein sending the securitized file-sharing user interface to the user device causes the user device to display the securitized file-sharing user interface.

3. The system of claim 1, the second memory storing computer-readable instructions that, when executed by the second processor, cause the neural network analysis computing platform to:

send, to the dynamic event securitization computing platform, the system reconfiguration instructions, wherein the sending the system reconfiguration instructions to the dynamic event securitization computing platform causes the dynamic event securitization computing platform to modify one or more security settings of the dynamic event securitization computing platform based on the system reconfiguration instructions.

4. The system of claim 1, wherein the data securitization flag is associated with a first event analysis module of the plurality of event analysis modules.

5. The system of claim 4, wherein modifying the analysis results comprises modifying a first weighted risk score output by the first event analysis module.

6. The system of claim 1, the second memory storing computer-readable instructions that, when executed by the second processor, cause the neural network analysis computing platform to:

send, to the dynamic event securitization computing platform, the system reconfiguration instructions, wherein the sending the system reconfiguration instructions to the dynamic event securitization computing platform causes the dynamic event securitization computing platform to modify one or more security settings of the dynamic event securitization computing platform based on the system reconfiguration instructions.

7. The system of claim 1, wherein a first event analysis module of the plurality of event analysis modules detects, within the data associated with the first event, one or more of encrypted files, multi-level file embedding, or files embedded within an object.

8. The system of claim 1, wherein a first event analysis module of the plurality of event analysis modules analyzes historical data of a user associated with the first event.

9. The system of claim 1, wherein a first event analysis module of the plurality of event analysis modules analyzes a target domain associated with the first event.

10. The system of claim 1, wherein a first event analysis module of the plurality of event analysis modules analyzes access rights of a user associated with the first event.

11. A method comprising:

at a dynamic event securitization computing platform of a dynamic event securitization and neural analysis system, the dynamic event securitization computing platform comprising at least one processor, a communication interface, and memory:

receiving, from a user device, a first event;

generating, based on the first event, a securitized file-sharing user interface configured to receive one or more files for secure sharing to a remote computing device located outside of an enterprise network;

sending, to the user device, the securitized file-sharing user interface;

receiving, from the user device, one or more data files; and generating, based on a result of inspecting each of the one or more data files, a data securitization flag that causes a neural network analysis computing platform to modify event analysis results; and at the neural network analysis computing platform of the dynamic event securitization and neural analysis system, the neural network analysis computing platform comprising at least one processor, a communication interface, and memory:

receiving, from the dynamic event securitization computing platform, the data securitization flag and the data associated with the first event;

analyzing, using a plurality of event analysis modules, the data associated with the first event to generate analysis results;

modifying, based on the data securitization flag, the analysis results to generate modified analysis results;

inputting the modified analysis results into a neural network model;

receiving, from the neural network model, a risk level value associated with the first event;

inputting data associated with the risk level value into a decision engine, wherein inputting the data associated with the risk level value into the decision engine causes the decision engine to output one or more reactionary commands based on the risk level value; and generating system reconfiguration instructions associated with the one or more reactionary commands.

12. The method of claim 11, wherein sending the securitized file-sharing user interface to the user device causes the user device to display the securitized file-sharing user interface.

13. The method of claim 11, at the neural network analysis computing platform:

sending, to the dynamic event securitization computing platform, the system reconfiguration instructions, wherein the sending the system reconfiguration instructions to the dynamic event securitization computing platform causes the dynamic event securitization computing platform to modify one or more security settings of the dynamic event securitization computing platform based on the system reconfiguration instructions.

14. The method of claim 11, wherein the data securitization flag is associated with a first event analysis module of the plurality of event analysis modules.

15. The method of claim 14, wherein modifying the analysis results comprises modifying a first weighted risk score output by the first event analysis module.

16. The method of claim 11, at the neural network analysis computing platform:
sending, to the dynamic event securitization computing platform, the system reconfiguration instructions, wherein the sending the system reconfiguration instructions to the dynamic event securitization computing platform causes the dynamic event securitization computing platform to modify one or more security settings of the dynamic event securitization computing platform based on the system reconfiguration instructions.

17. The method of claim 11, wherein a first event analysis module of the plurality of event analysis modules detects within the data associated with the first event, one or more of encrypted files, multi-level file embedding, or files embedded within an object.

18. The method of claim 11, wherein a first event analysis module of the plurality of event analysis modules analyzes historical data of a user associated with the first event.

19. The method of claim 11, wherein a first event analysis module of the plurality of event analysis modules analyzes a target domain associated with the first event.

20. A plurality of non-transitory computer-readable media comprising:
a first non-transitory computer-readable media storing instructions that, when executed by a dynamic event securitization computing platform comprising at least one processor, a communication interface, and memory, cause the dynamic event securitization computing platform to:
receive, from a user device, a first event;
generate, based on the first event, a securitized file-sharing user interface configured to receive one or more files for secure sharing to a remote computing device located outside of an enterprise network;
send, to the user device, the securitized file-sharing user interface;
receive, from the user device, one or more data files;
generate, based on a result of inspecting each of the one or more data files, a data securitization flag that causes a neural network analysis computing platform to modify event analysis results; and
send, to a neural network analysis computing platform, the data securitization flag and data associated with the first event; and
a second non-transitory computer-readable media storing instructions that, when executed by the neural network analysis computing platform comprising at least one processor, a communication interface, and memory, cause the neural network computing platform to:
receive, from the dynamic event securitization computing platform, the data securitization flag and the data associated with the first event;
analyze, using a plurality of event analysis modules, the data associated with the first event to generate analysis results;
modify, based on the data securitization flag, the analysis results to generate modified analysis results;
input the modified analysis results into a neural network model;
receive, from the neural network model, a risk level value associated with the first event;
input data associated with the risk level value into a decision engine, wherein inputting the data associated with the risk level value into the decision engine causes the decision engine to output one or more reactionary commands based on the risk level value; and
generate system reconfiguration instructions associated with the one or more reactionary commands.

\* \* \* \* \*